US011183189B2

(12) United States Patent
Taki et al.

(10) Patent No.: US 11,183,189 B2
(45) Date of Patent: Nov. 23, 2021

(54) INFORMATION PROCESSING APPARATUS AND INFORMATION PROCESSING METHOD FOR CONTROLLING DISPLAY OF A USER INTERFACE TO INDICATE A STATE OF RECOGNITION

(71) Applicant: SONY CORPORATION, Tokyo (JP)

(72) Inventors: Yuhei Taki, Kanagawa (JP); Kunihito Sawai, Kanagawa (JP); Shinichi Kawano, Tokyo (JP)

(73) Assignee: SONY CORPORATION, Tokyo (JP)

(*) Notice: Subject to any disclaimer, the term of this patent is extended or adjusted under 35 U.S.C. 154(b) by 115 days.

(21) Appl. No.: 16/463,178

(22) PCT Filed: Sep. 21, 2017

(86) PCT No.: PCT/JP2017/034090
§ 371 (c)(1),
(2) Date: May 22, 2019

(87) PCT Pub. No.: WO2018/116556
PCT Pub. Date: Jun. 28, 2018

(65) Prior Publication Data
US 2020/0066269 A1    Feb. 27, 2020

(30) Foreign Application Priority Data

Dec. 22, 2016    (JP) .............................. JP2016-249485

(51) Int. Cl.
G10L 15/22    (2006.01)
G06F 3/0484    (2013.01)
(Continued)

(52) U.S. Cl.
CPC ............ G10L 15/22 (2013.01); G06F 3/0484 (2013.01); G06F 3/167 (2013.01); G10L 15/26 (2013.01); G10L 2015/225 (2013.01)

(58) Field of Classification Search
CPC ...... G06F 3/167; G06F 3/0484; G06F 3/0481; G06F 3/16
(Continued)

(56) References Cited

U.S. PATENT DOCUMENTS 6,075,534 A     6/2000  Vanbuskirk et al.
2005/0165609 A1* 7/2005  Zuberec .................. G10L 15/22
                                                    704/270

(Continued)

FOREIGN PATENT DOCUMENTS

JP    2001-166860 A    6/2001
JP    2002-116792 A    4/2002
(Continued)

OTHER PUBLICATIONS

International Search Report and Written Opinion of PCT Application No. PCT/JP2017/034090, dated Nov. 28, 2017, 09 pages of ISRWO.

(Continued)

Primary Examiner — Jesse S Pullias
(74) Attorney, Agent, or Firm — Chip Law Group

(57) ABSTRACT

An information processing apparatus including an output control unit that controls display of a user interface related to a recognition application. The output control unit causes a visual effect to be output to an input field to which a recognition result is input, the visual effect indicating a state related to recognition. Also provided is an information processing method including controlling, by a processor, display of a user interface related to a recognition application. Controlling of the display further includes causing a visual effect to be output to an input field to which a recognition result is input, the visual effect indicating a state related to recognition.

13 Claims, 26 Drawing Sheets

(51) Int. Cl.
*G06F 3/16* (2006.01)
*G10L 15/26* (2006.01)

(58) Field of Classification Search
USPC .................................. 704/231–257, 270–275
See application file for complete search history.

(56) References Cited

U.S. PATENT DOCUMENTS

| | | | |
|---|---|---|---|
| 2010/0036660 A1* | 2/2010 | Bennett | G10L 17/26 704/231 |
| 2012/0089392 A1* | 4/2012 | Larco | G10L 15/063 704/231 |
| 2013/0021362 A1* | 1/2013 | Sakurada | G06F 3/167 345/589 |
| 2014/0207452 A1* | 7/2014 | Klein | G06F 3/0304 704/235 |
| 2014/0304605 A1 | 10/2014 | Ohmura et al. | |
| 2014/0337788 A1* | 11/2014 | Hu | G06F 3/0481 715/780 |
| 2015/0261496 A1* | 9/2015 | Faaborg | G06F 3/167 715/728 |
| 2016/0163331 A1* | 6/2016 | Yamaguchi | G11B 27/105 704/235 |
| 2017/0229121 A1 | 8/2017 | Taki et al. | |

FOREIGN PATENT DOCUMENTS

| | | |
|---|---|---|
| JP | 2014-203207 A | 10/2014 |
| WO | 2016/103988 A1 | 6/2016 |

OTHER PUBLICATIONS

Office Action for JP Patent Application No. 2018-557542, dated Mar. 2, 2021, 3 pages of Office Action and 3 pages of English Translation.

* cited by examiner

FIG. 6B
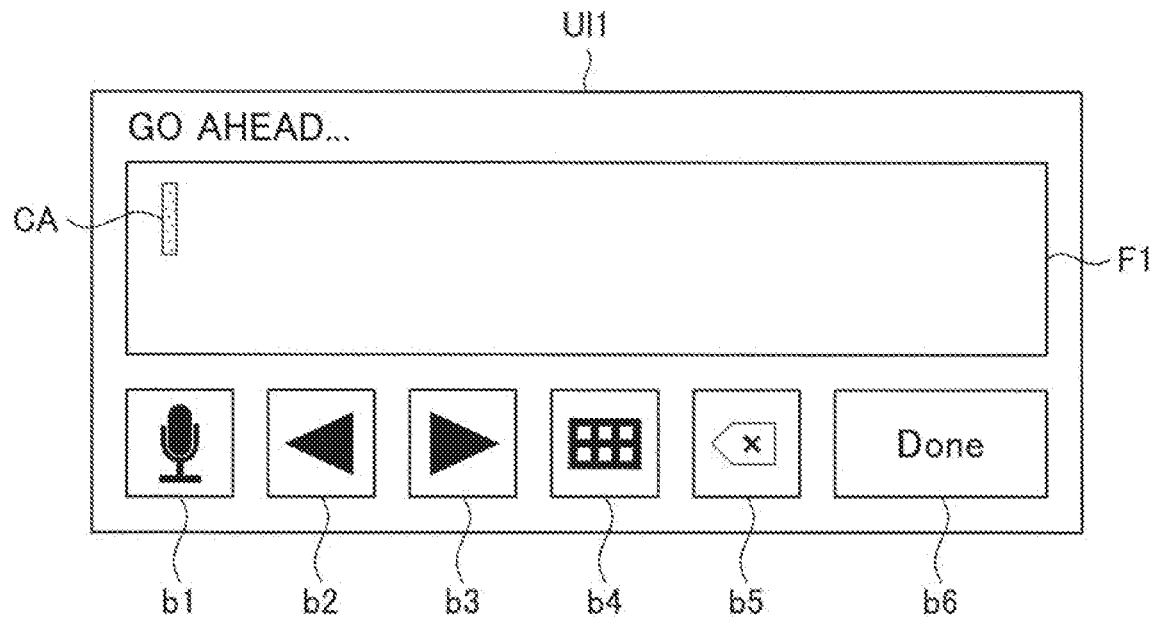
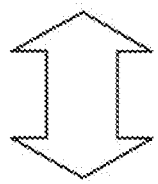
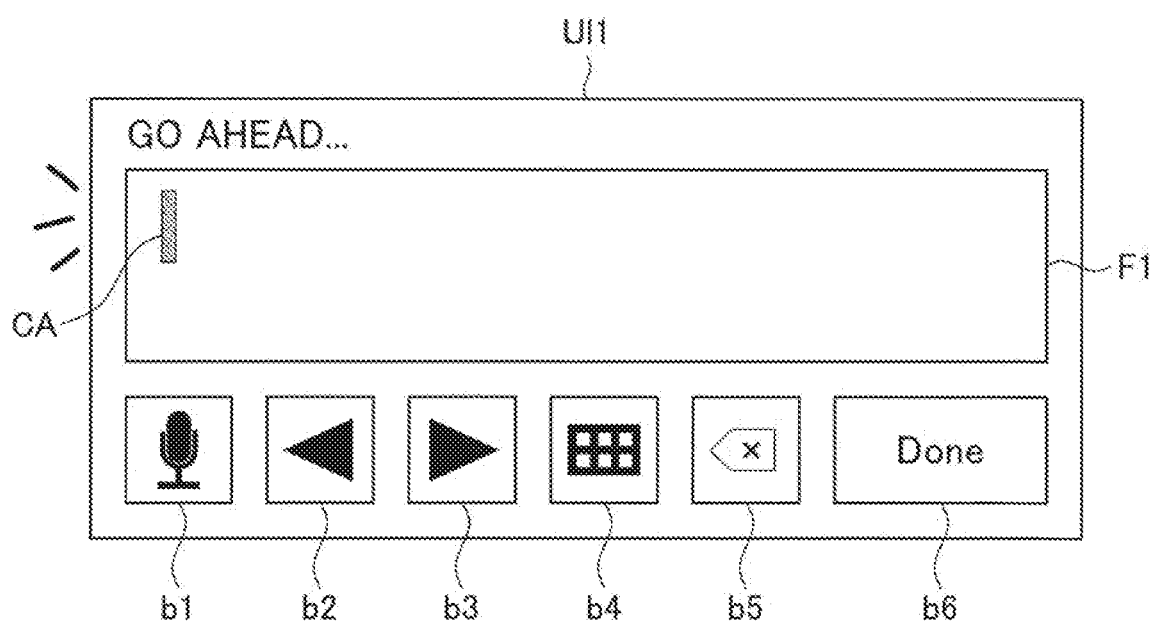

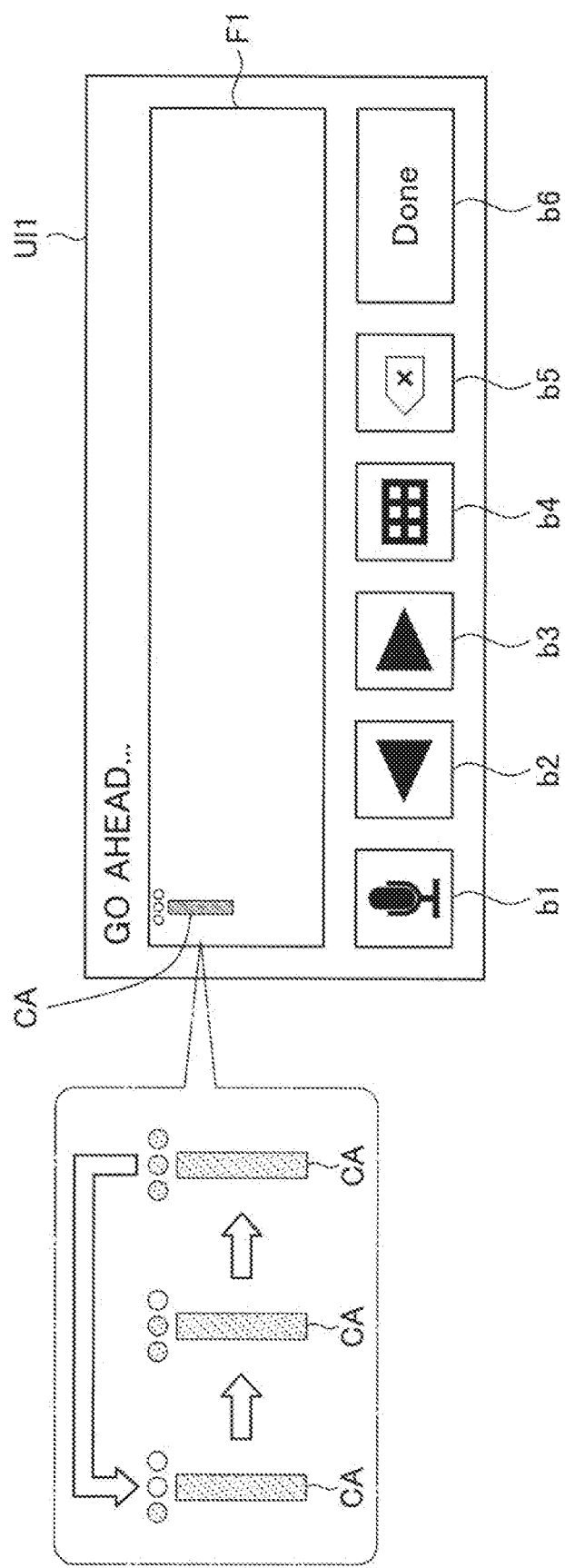

FIG. 6D
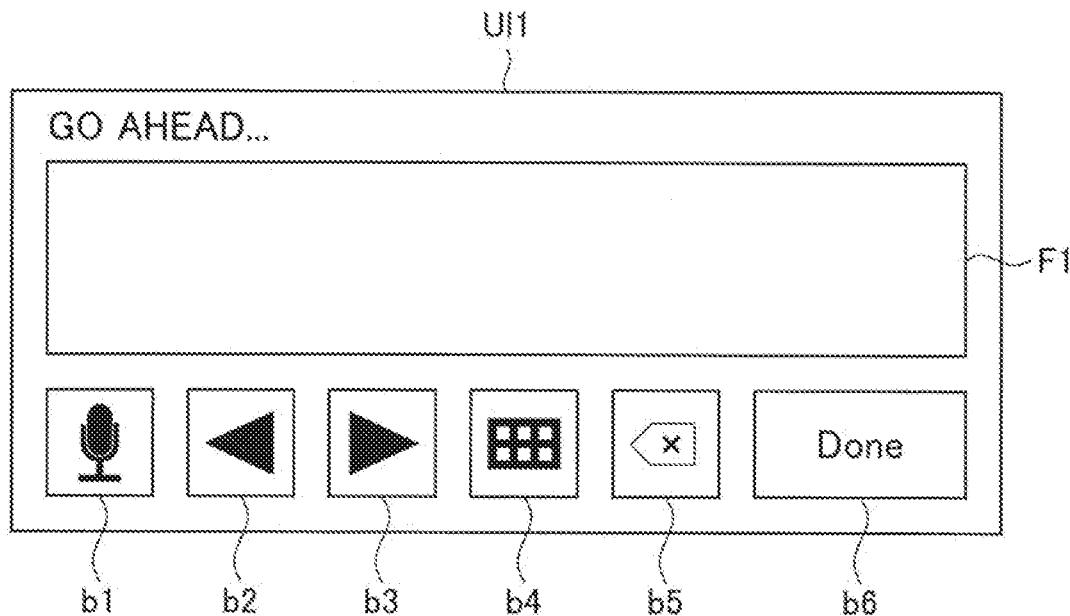
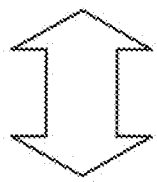
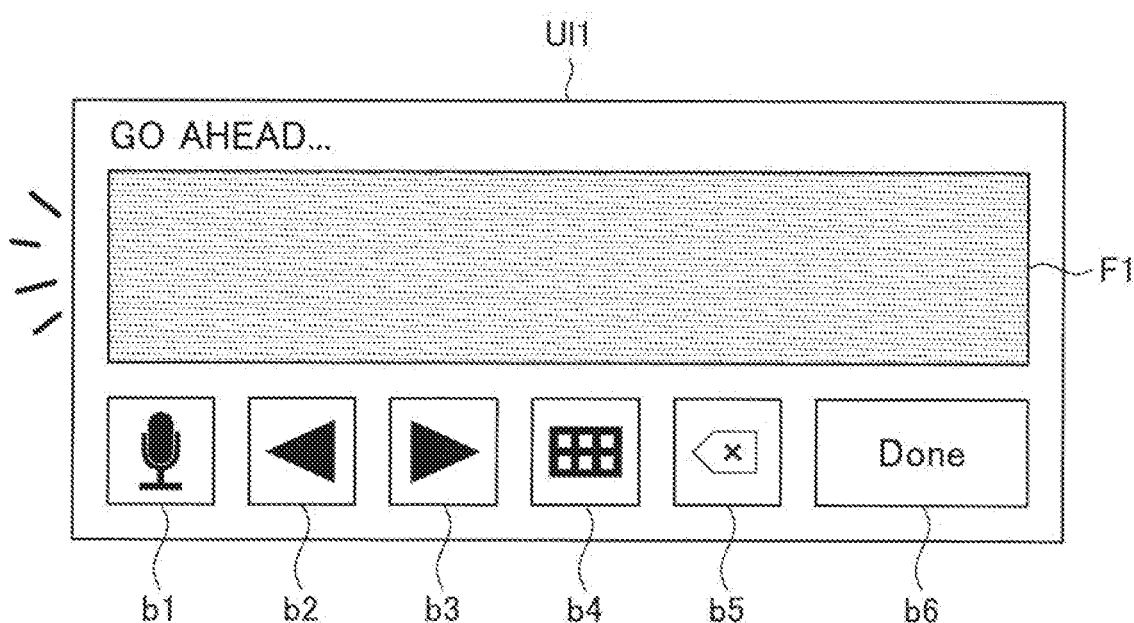

FIG. 6E
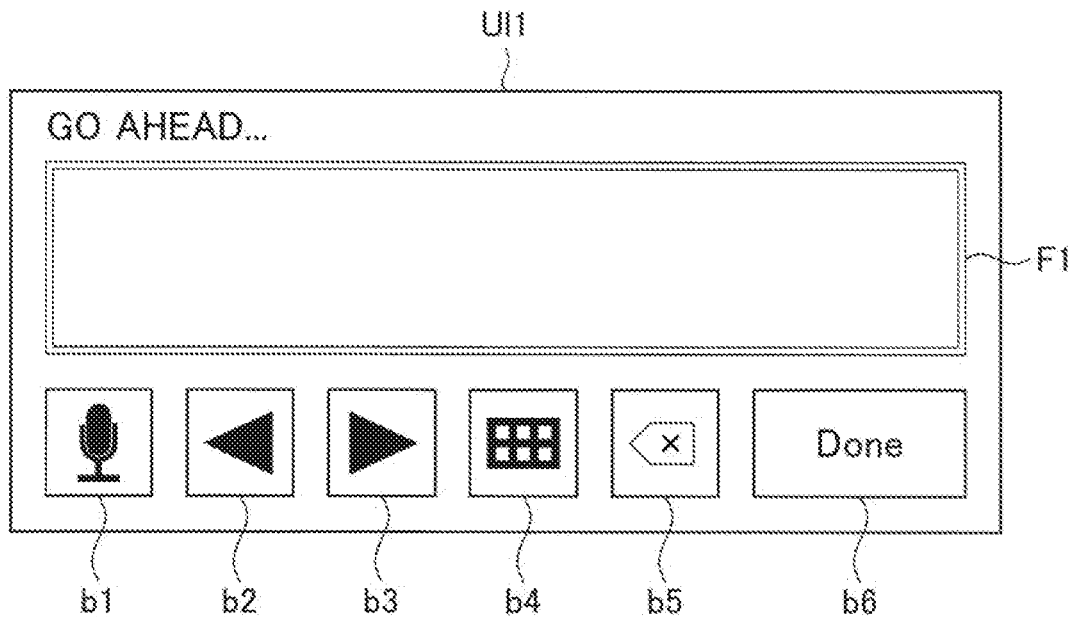
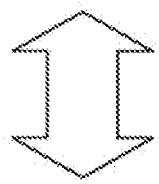
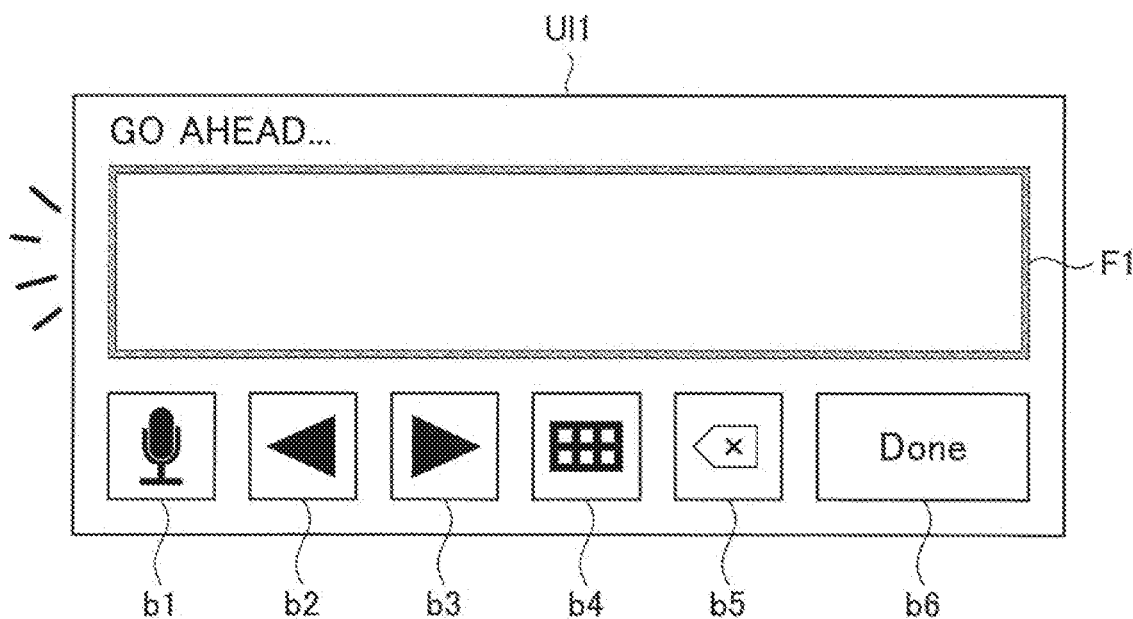

FIG. 6F
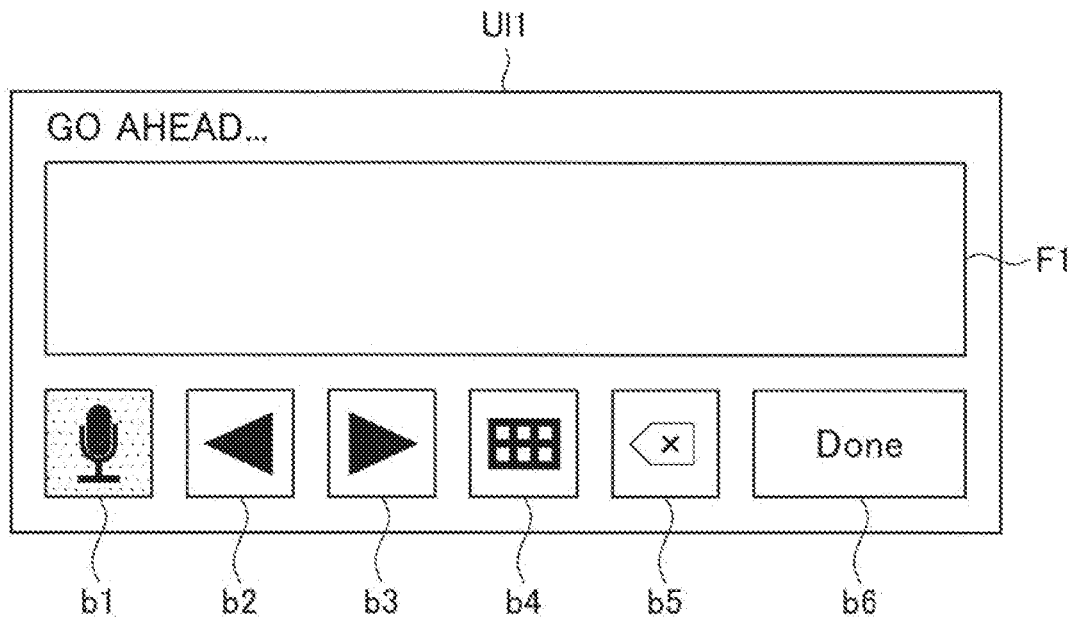
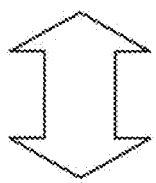
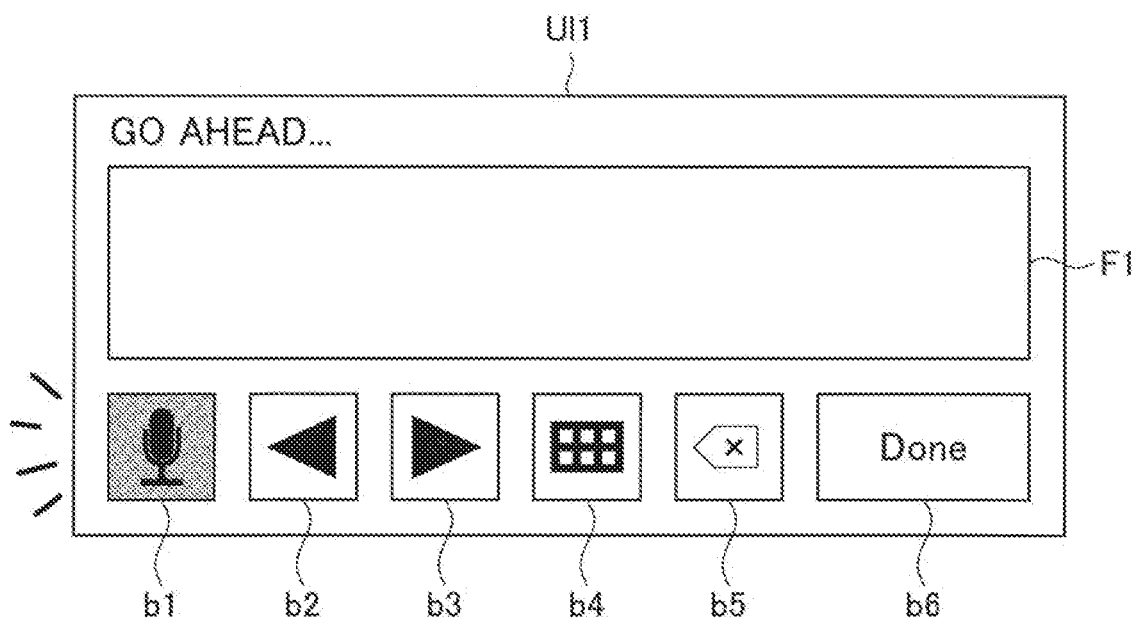

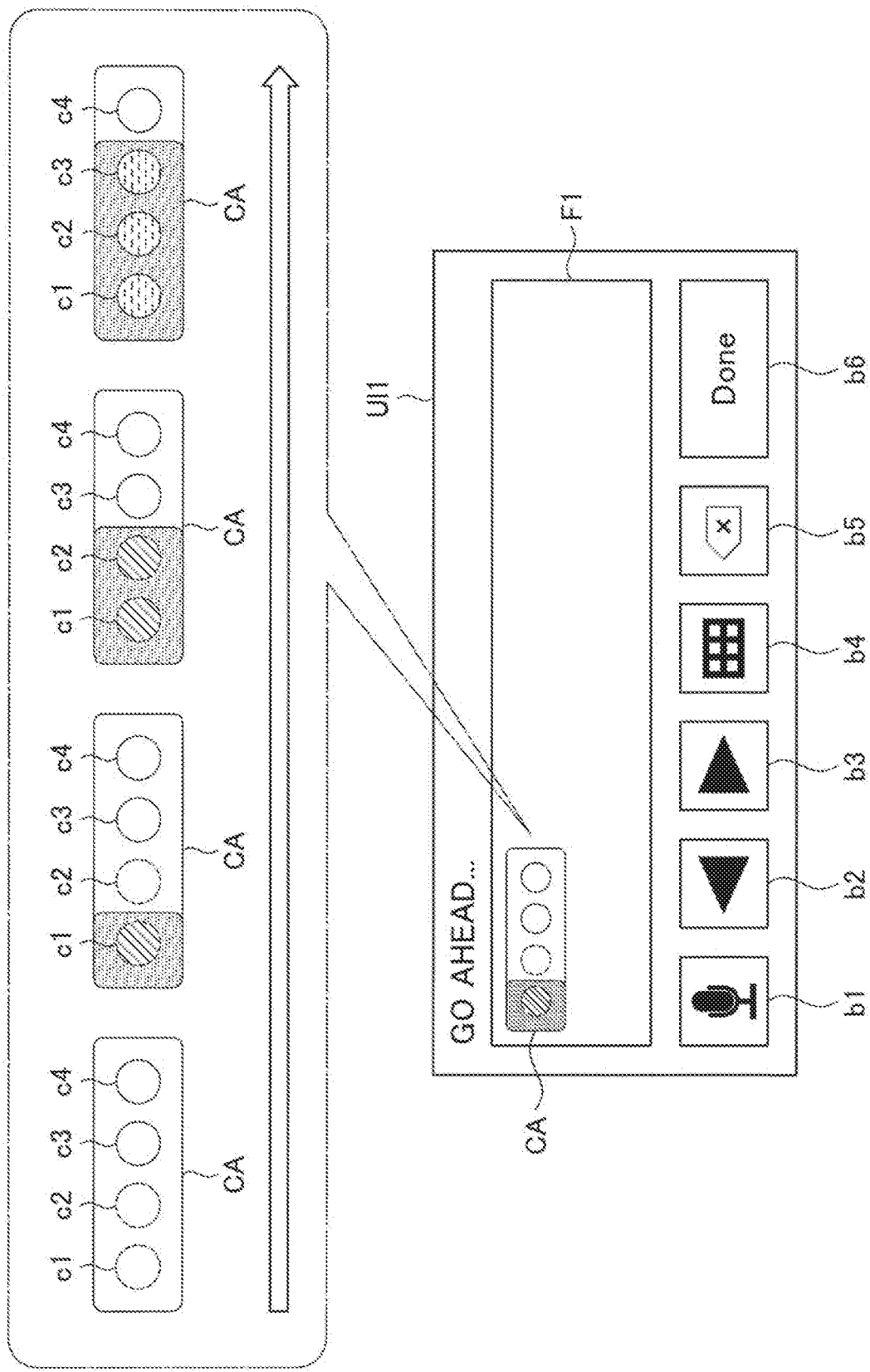

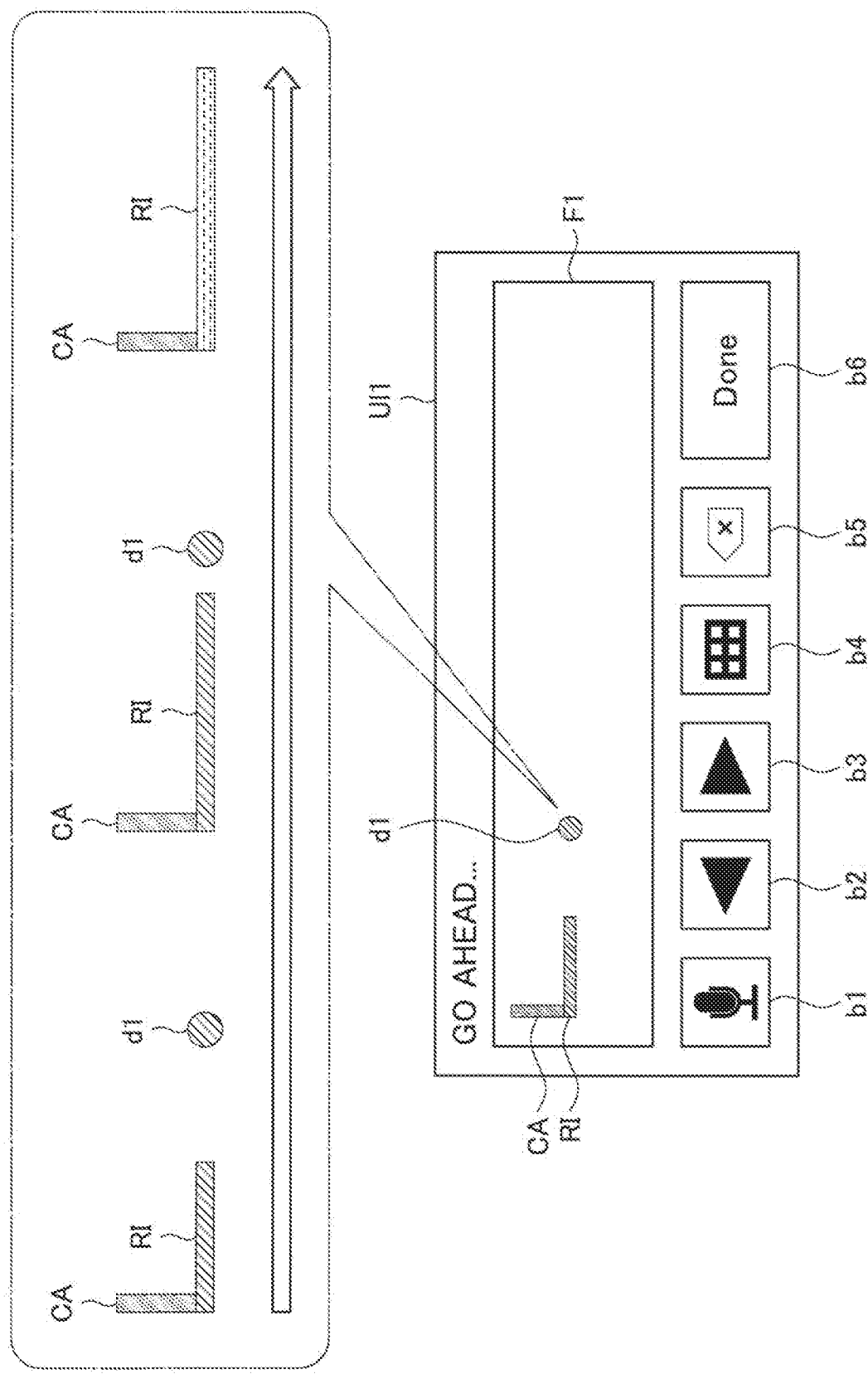

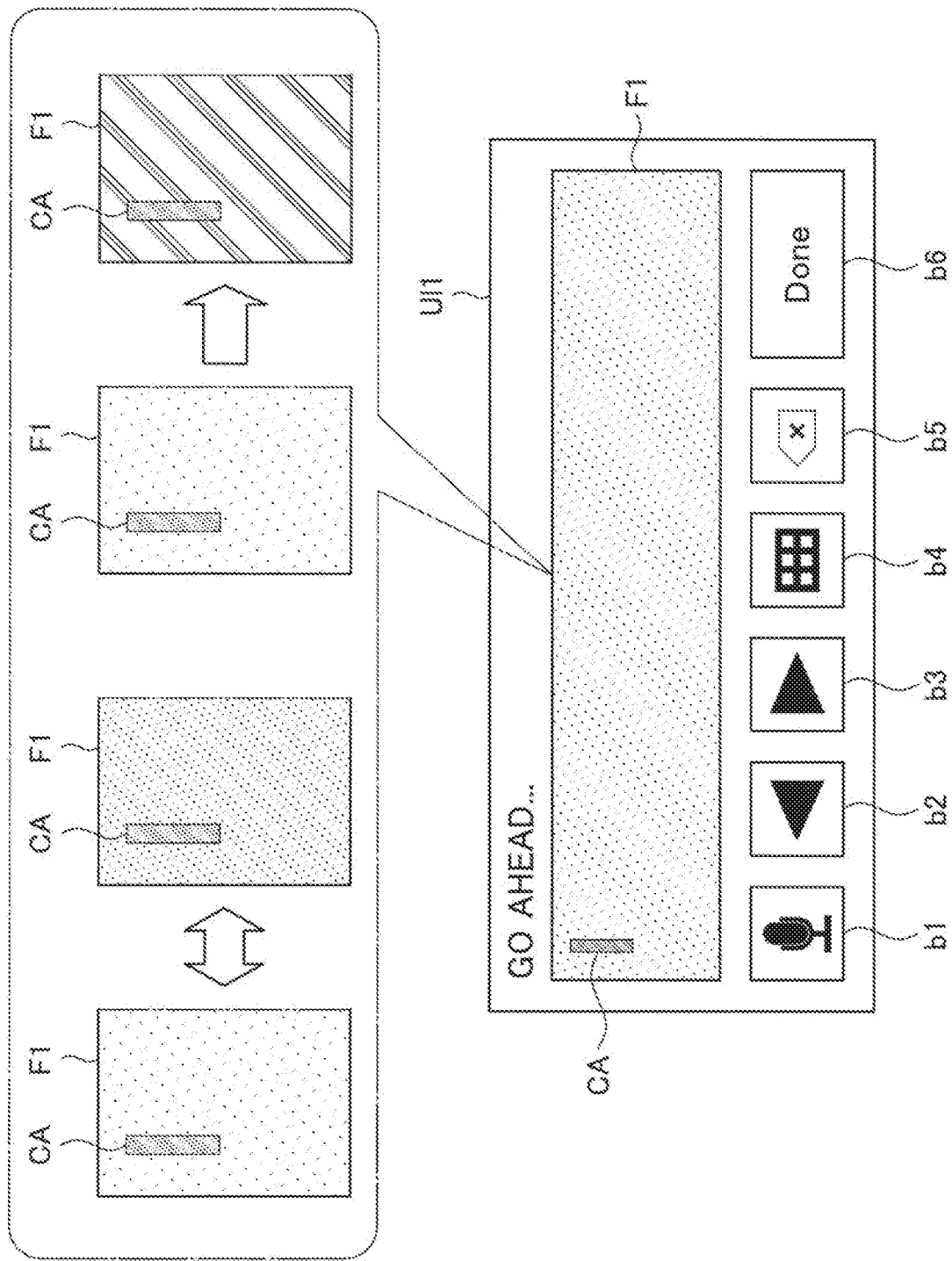

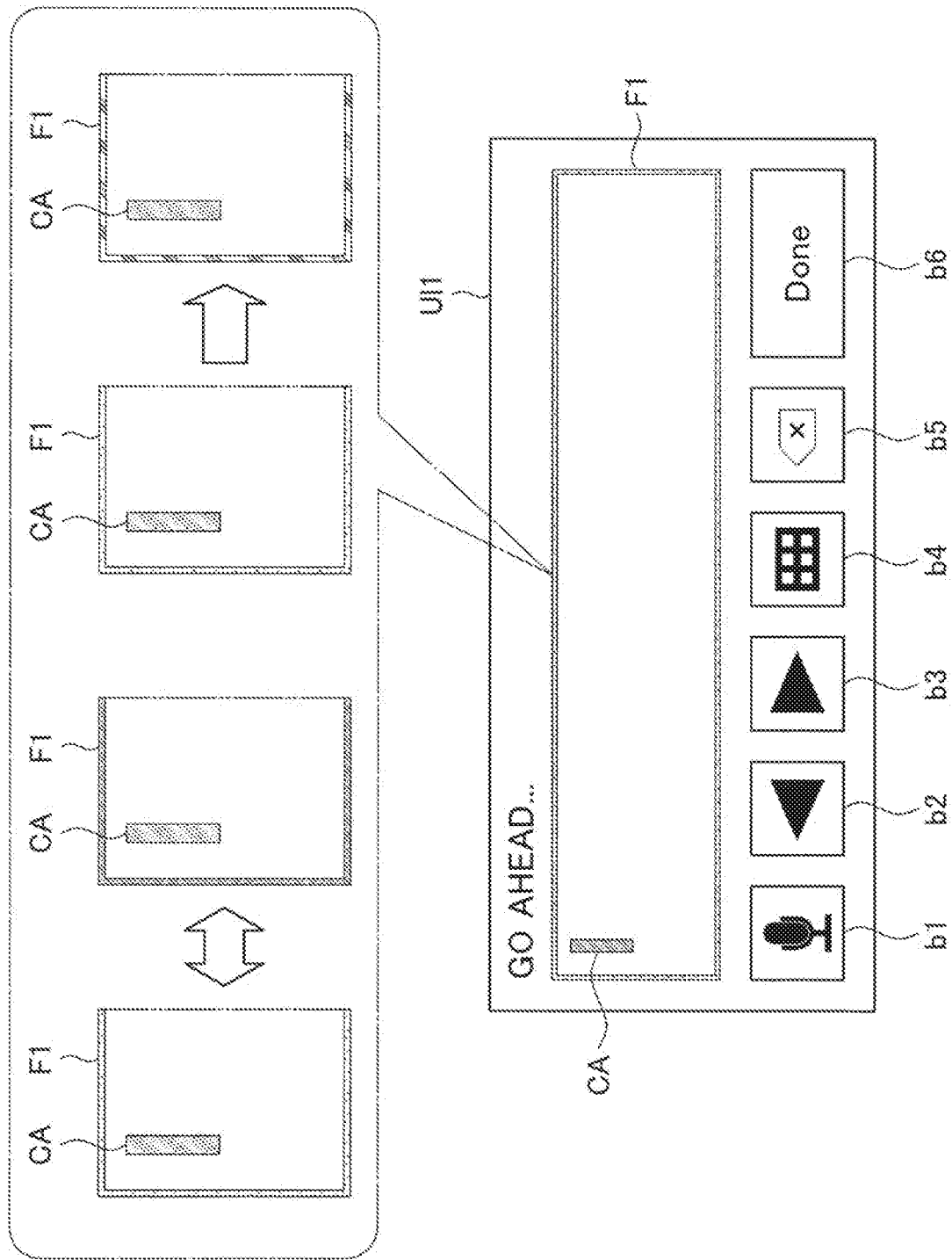

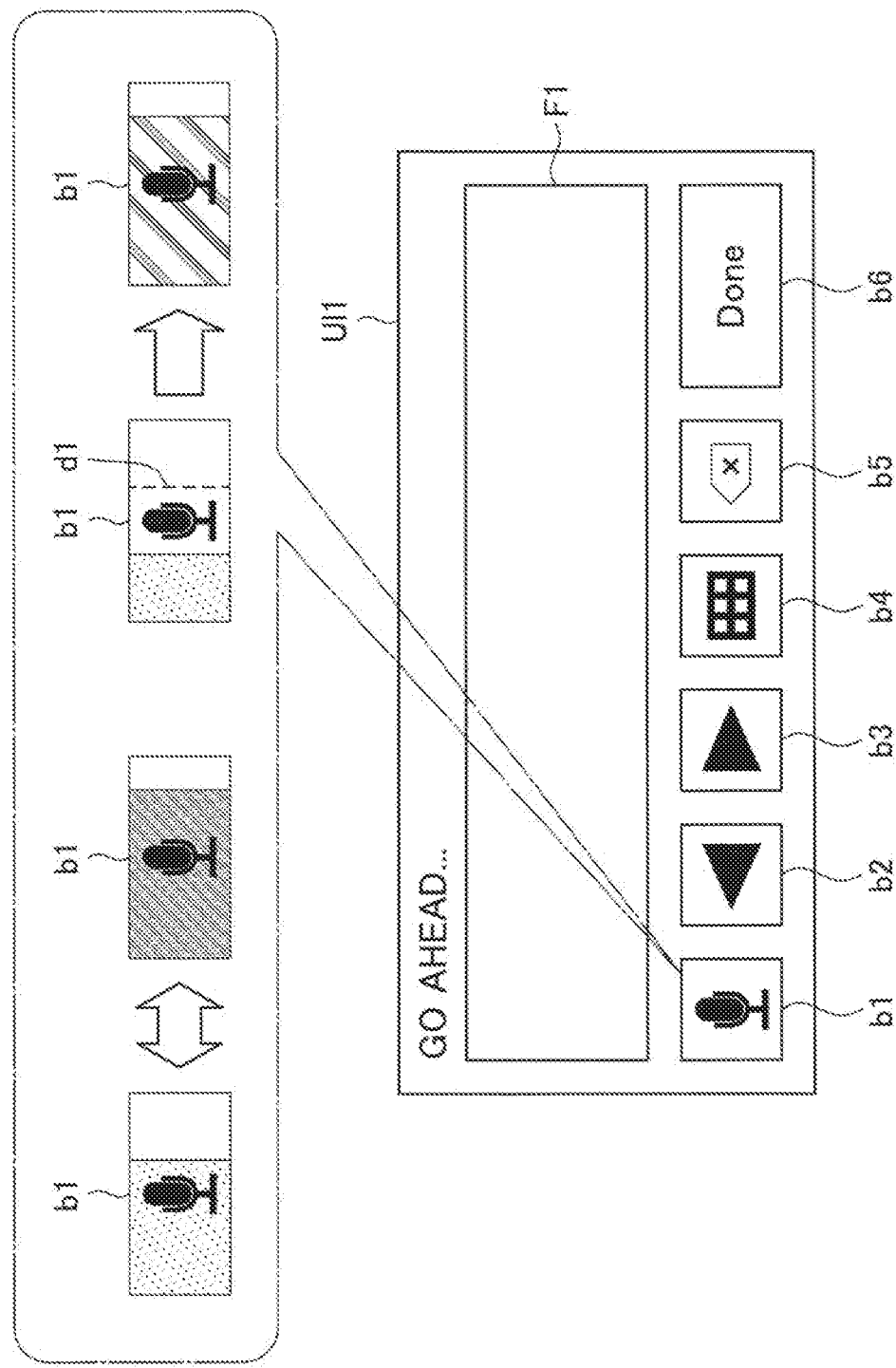

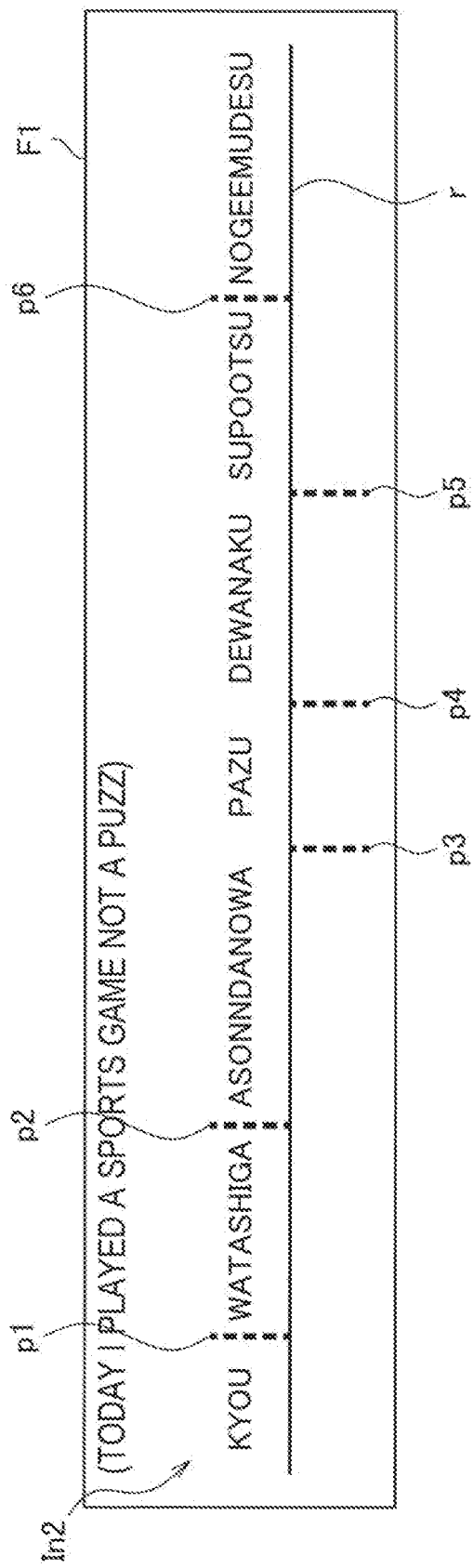

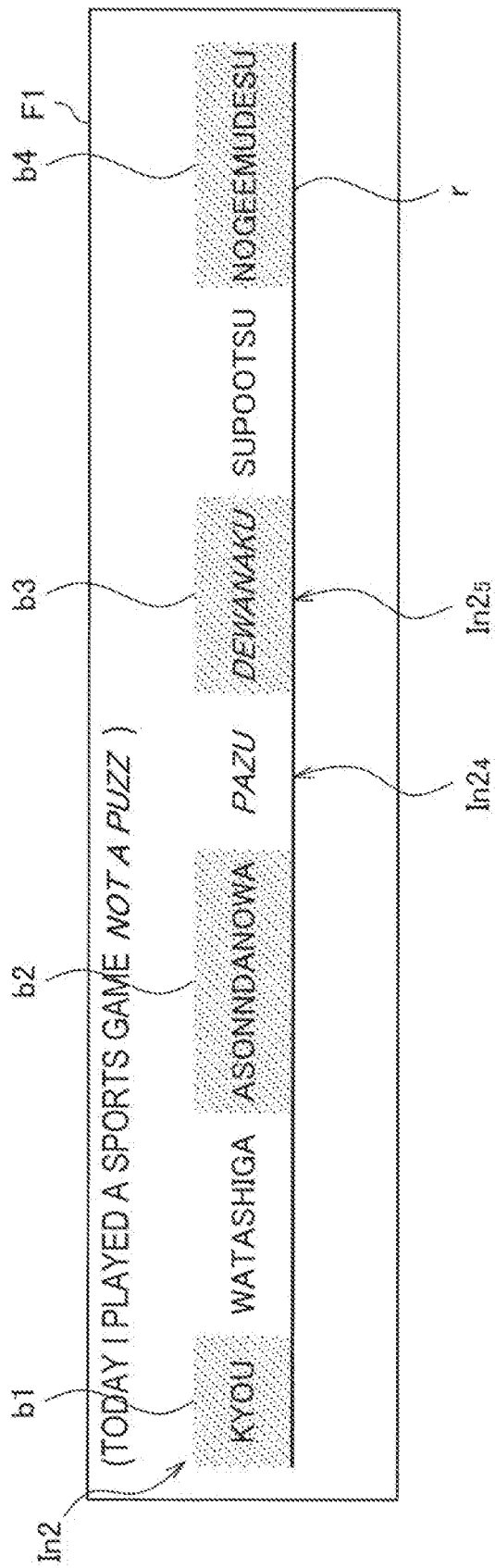

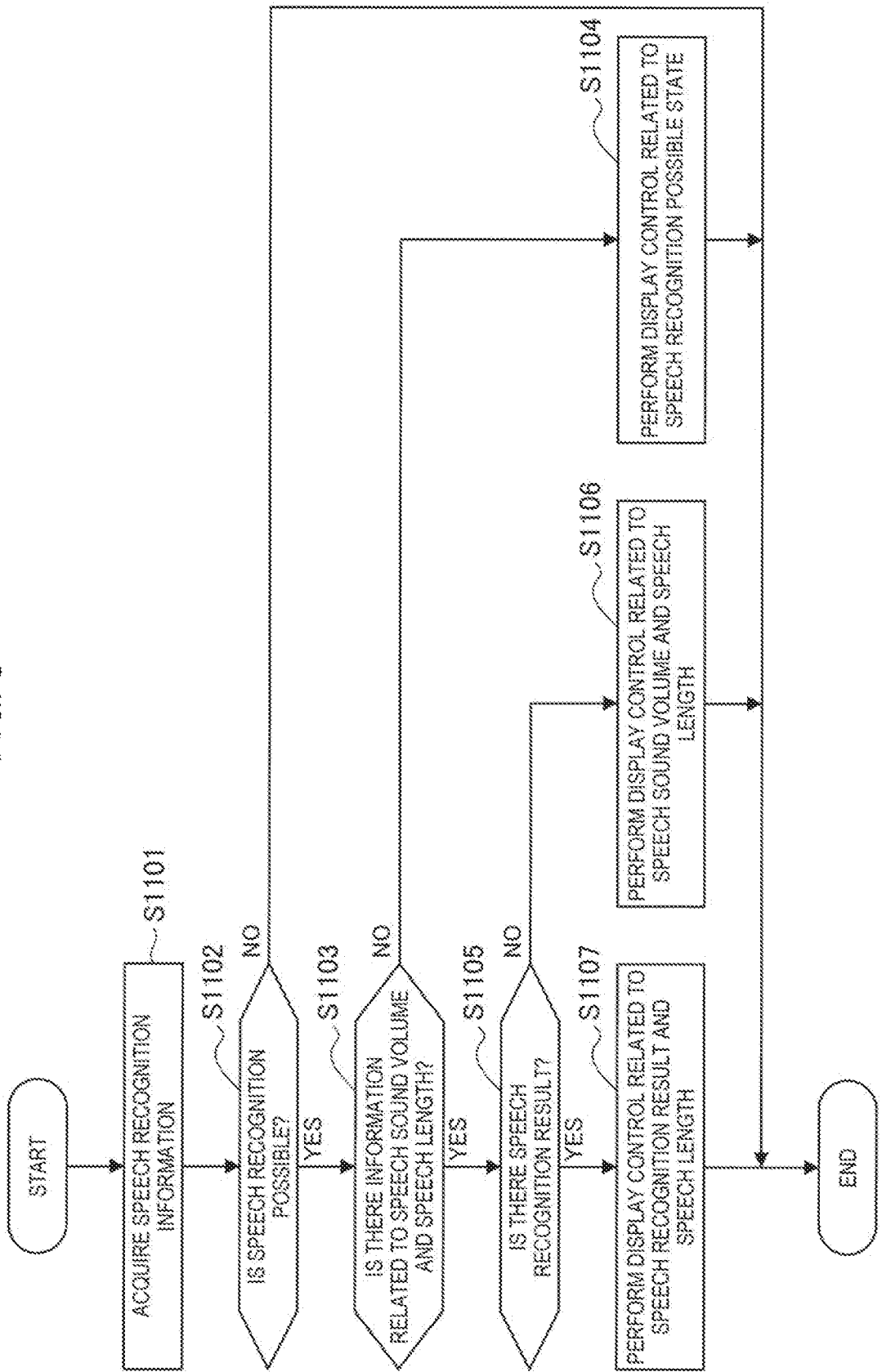

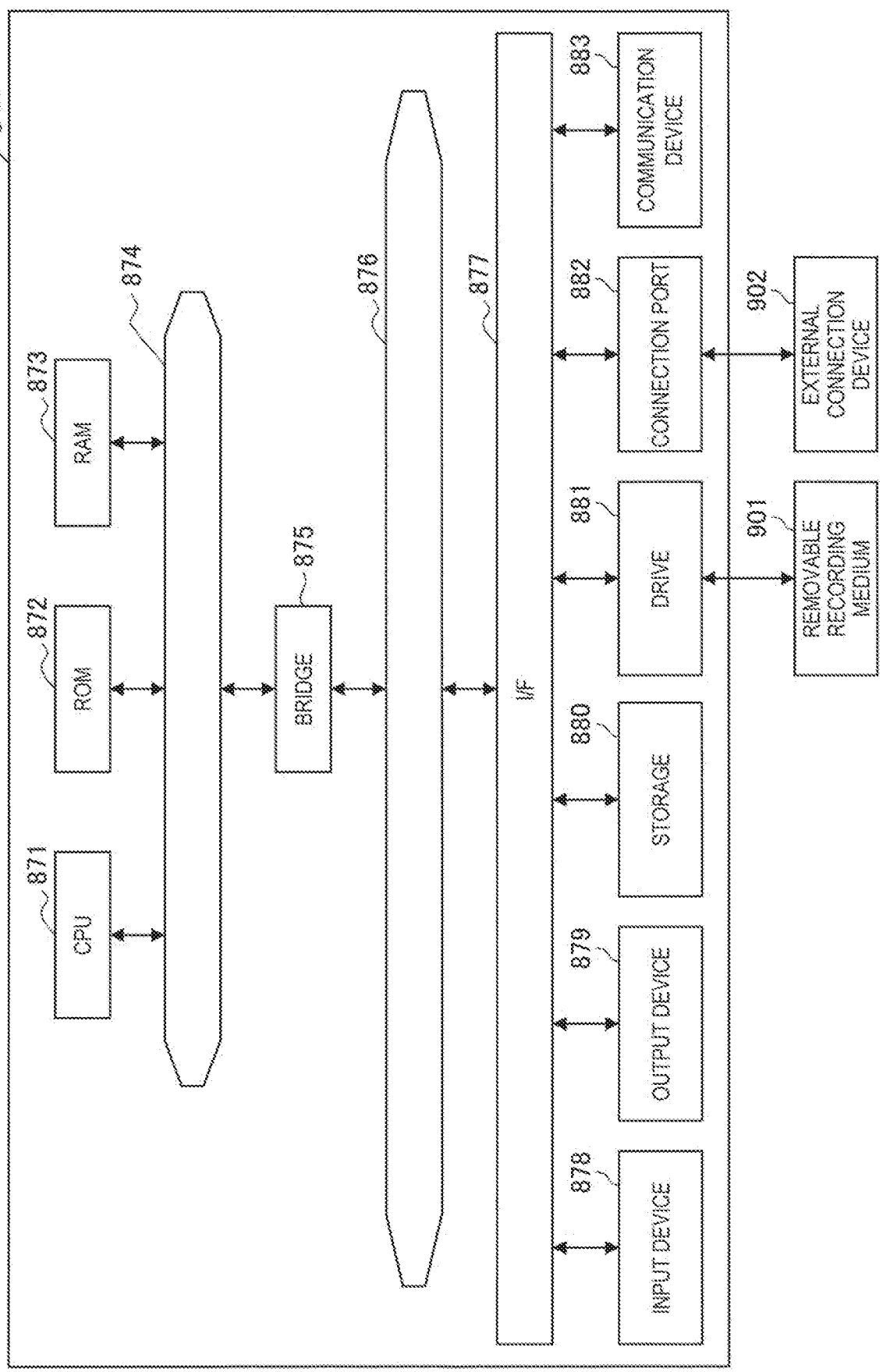

INFORMATION PROCESSING APPARATUS AND INFORMATION PROCESSING METHOD FOR CONTROLLING DISPLAY OF A USER INTERFACE TO INDICATE A STATE OF RECOGNITION

CROSS REFERENCE TO RELATED APPLICATIONS

This application is a U.S. National Phase of International Patent Application No. PCT/JP2017/034090 filed on Sep. 21, 2017, which claims priority benefit of Japanese Patent Application No. JP 2016-249485 filed in the Japan Patent Office on Dec. 22, 2016. Each of the above-referenced applications is hereby incorporated herein by reference in its entirety.

TECHNICAL FIELD

The present disclosure relates to an information processing apparatus and an information processing method.

BACKGROUND ART

In recent years, various kinds of apparatuses that perform recognition based on behavior or states of a user and executes a process corresponding to a result of the recognition have been widespread. In addition, with regard to such apparatuses, many technologies of improving convenience of the users related to a recognition process have been proposed. For example, Patent Literature 1 discloses an information processing device capable of selecting and correcting a character string input by a user through speech recognition in units of segments.

CITATION LIST

Patent Literature

Patent Literature 1: WO 2015/059976

DISCLOSURE OF INVENTION

Technical Problem

Meanwhile, the above-described recognition device sometimes displays an object or the like on a user interface, the object indicating a state related to recognition. For example, the object may be used for letting a user know that the recognition starts. However, such an object is often placed at a position different from a field to which a recognition result is input. Therefore, the user shoulders a burden of moving his/her gaze between the object and the recognition result.

Accordingly, the present disclosure proposes a novel and improved information processing apparatus and information processing method that are capable of reducing the burden of moving a gaze on a user interface related to a recognition application.

Solution to Problem

According to the present disclosure, there is provided an information processing apparatus including an output control unit configured to control display of a user interface related to a recognition application. The output control unit causes a visual effect to be output to an input field to which a recognition result is input, the visual effect indicating a state related to recognition.

In addition, according to the present disclosure, there is provided an information processing method including controlling, by a processor, display of a user interface related to a recognition application. Controlling of the display further includes causing a visual effect to be output to an input field to which a recognition result is input, the visual effect indicating a state related to recognition.

Advantageous Effects of Invention

As described above, according to the present disclosure, it is possible to reduce a burden of moving a gaze on a user interface related to a recognition application.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6B is a diagram illustrating a control example of a visual effect indicating a state related to whether or not speech recognition is possible according to the embodiment.

FIG. 6C is a diagram illustrating a control example of a visual effect indicating a state related to whether or not speech recognition is possible according to the embodiment.

FIG. 6D is a diagram illustrating a control example of a visual effect indicating a state related to whether or not speech recognition is possible according to the embodiment.

FIG. 6E is a diagram illustrating a control example of a visual effect indicating a state related to whether or not speech recognition is possible according to the embodiment.

FIG. 6F is a diagram illustrating a control example of a visual effect indicating a state related to whether or not speech recognition is possible according to the embodiment.

FIG. 7A is a diagram illustrating a control example of a visual effect indicating feedback about a speech according to the embodiment.

FIG. 7B is a diagram illustrating a control example of a visual effect indicating feedback about a speech according to the embodiment.

FIG. 7D is a diagram illustrating a control example of a visual effect indicating feedback about a speech according to the embodiment.

FIG. 7E is a diagram illustrating a control example of a visual effect indicating feedback about a speech according to the embodiment.

FIG. 7F is a diagram illustrating a control example of a visual effect indicating feedback about a speech according to the embodiment.

FIG. 8C is a diagram illustrating a control example of a visual effect that is displayed together with a speech recognition result according to the embodiment.

FIG. 8E is a diagram illustrating a control example of a visual effect that is displayed together with a speech recognition result according to the embodiment.

FIG. 9 is a flowchart illustrating procedure of operation of the information processing terminal according to the embodiment.

FIG. 10 is a hardware configuration example according to the present disclosure.

MODE(S) FOR CARRYING OUT THE INVENTION

Figure 1A:
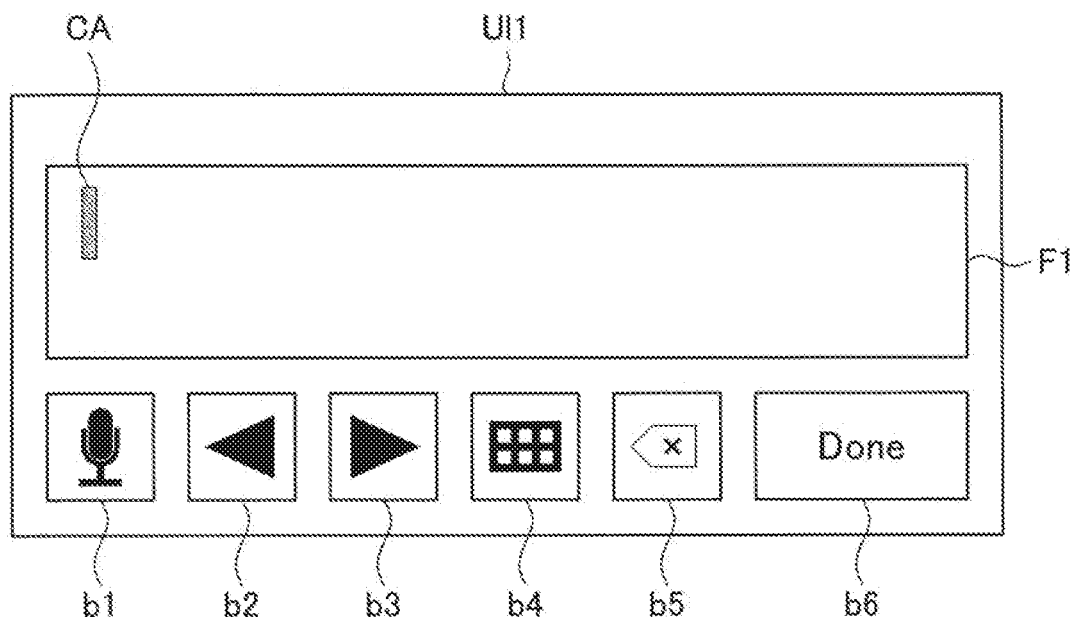
FIG. 1A is a diagram illustrating an overview of an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, the description is given in the following order.
1. Embodiment
1.1. Overview of embodiment
1.2. System configuration example
1.3. Functional configuration example of information processing terminal 10
1.4. Functional configuration example of information processing server 20
1.5. Detail of output control exerted by output control unit 130
1.6. Procedure of operation of information processing terminal 10
2. Hardware configuration example
3. Conclusion

1. Embodiment

1.1. Overview of Embodiment

First, an overview of an embodiment according to the present disclosure will be described. As described above, in recent years, various kinds of apparatuses that operate on the basis of various kinds of recognition technologies have been developed. In addition, there are many user interfaces related to recognition applications. However, in many cases, an input field to which a recognition result is input is placed at a different position from an object indicating a state of recognition, on the above-described user interface. For example, such objects may include an object indicating that recognition is started, an object indicating feedback about speech sound volume of a user, and the like.

Therefore, in the case where a user gazes at a recognition result, the user tends to miss information indicated by the above-described object. Accordingly, erroneous operation is induced such that the user speaks without taking a recognition starting action, for example. In addition, for example, in the case where the recognition technology is used as a function in a game, it is concerned that erroneous operation considerably undermines game experience. In addition, for example, in the case where the recognition technology is used in on-board equipment such as a car navigation system, we cannot ignore a possibility that a driver feels rushed by erroneous operation and an accident is induced.

The information processing apparatus and information processing method according to the present disclosure have been made in view of the above described matters. According to the present disclosure, it is possible for a user to considerably reduce a burden of moving a gaze on a user interface related to a recognition application. Therefore, a feature of the information processing apparatus and information processing method according to an embodiment of the present disclosure is that a visual effect is output to an input field to which a recognition result is input, the visual effect indicating a state related to recognition. Note that, for example, the recognition technology according to the embodiment includes speech recognition. In addition to the speech recognition, the recognition technology according to the embodiment may include a lip reading technology, an emotion estimation technology, an intention estimation technology, and the like. The lip reading technology converts a speech into a text on the basis of the shape of lips. The emotion estimation technology estimates emotion of a user from voice, biological information, or the like. The intention estimation technology is based on gaze recognition or behavior recognition. In the following description of the embodiment, a case where the recognition technology according to the present embodiment is the speech recognition is used as a main example.

FIGS. 1A, 1B, 1C, 1D, 1E, and 1F are diagrams illustrating an overview of the present embodiment. FIGS. 1A, 1B, 1C, 1D, 1E, and 1F illustrate a user interface UI1 controlled by an information processing apparatus according to the present embodiment. For example, the user interface UI1 may be displayed on a display unit or the like of an information processing terminal that provides a speech recognition application to a user. As illustrated in FIGS. 1A, 1B, 1C, 1D, 1E, and 1F, the user interface UI1 according to the present embodiment may include an input field F1, buttons b1 to b6, and the like, for example.

Here, the buttons b1 to b6 may be various kinds of buttons for controlling the speech recognition application. For example, the button b1 may be a button for switching start/stop of speech recognition. In addition, the buttons b2 and b3 may be buttons for moving an input position of a character string to right and left. In addition, the button b4 may be a button to be used for switching keyboards or the like. In addition, the button b5 may be a button for deleting an input character string. In addition, the button b6 may be a button for performing a fixing process on an input character string, for example.

In addition, the input field F1 may be a field to which a character string is input as a result of speech recognition. To the input field F1, a character string is input each time a speech of a user is recognized. In addition, to the input field F1 according to the present embodiment, a visual effect indicating a state related to speech recognition is output. For example, the visual effect may include various kinds of display objects. An example of the display object includes a position display object indicating an input position of a character string as illustrated in FIGS. 1A, 1B, 1C, 1D, 1E, and 1F, in other words, a caret CA.

At this time, for example, the information processing apparatus according to the present embodiment is capable of providing a user with various kinds of states related to speech recognition by changing a visual effect related to the caret CA.

The example illustrated in FIG. 1A indicates a state where the speech recognition application is not receiving a speech of a user, in other words, a state where a speech recognition function is turned off.

Figure 1B:
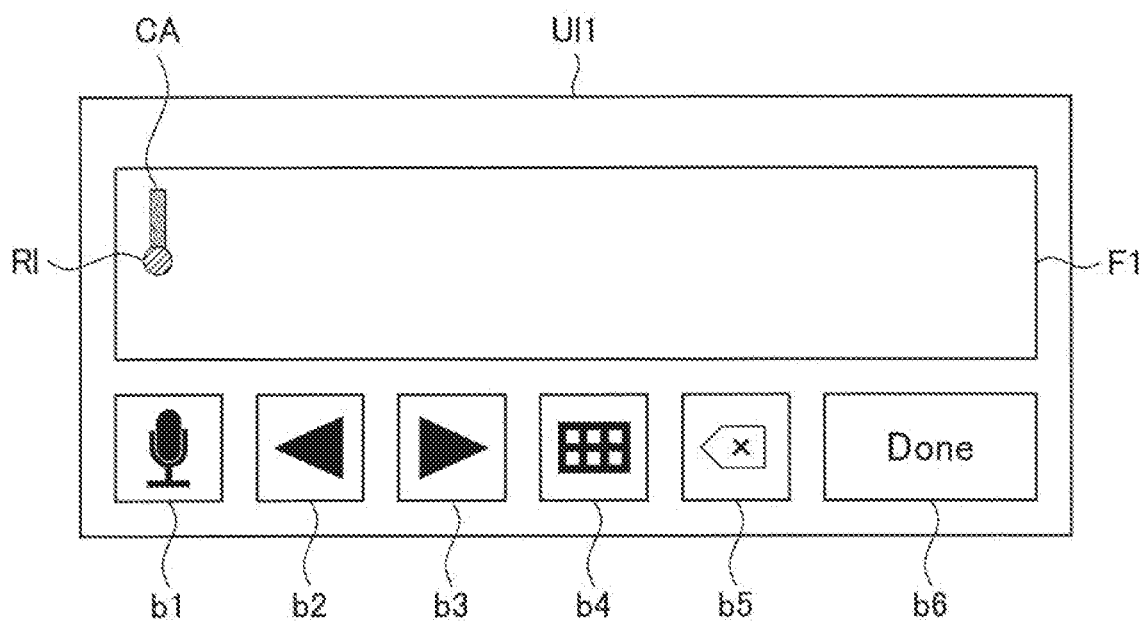
FIG. 1B is a diagram illustrating an overview of an embodiment of the present disclosure.

Here, in the case where the speech recognition function is turned on and the speech recognition application enters a state of waiting for a speech of a user, the information processing apparatus is capable of displaying an indicator RI under the caret CA as illustrated in FIG. 1B, for example. The indicator RI indicates a state where speech recognition is started. At this time, for example, the information processing apparatus may exert control by displaying the indicator RI and the caret CA in different colors such that the user can perceive the start of speech recognition more intuitively.

Figure 1C:
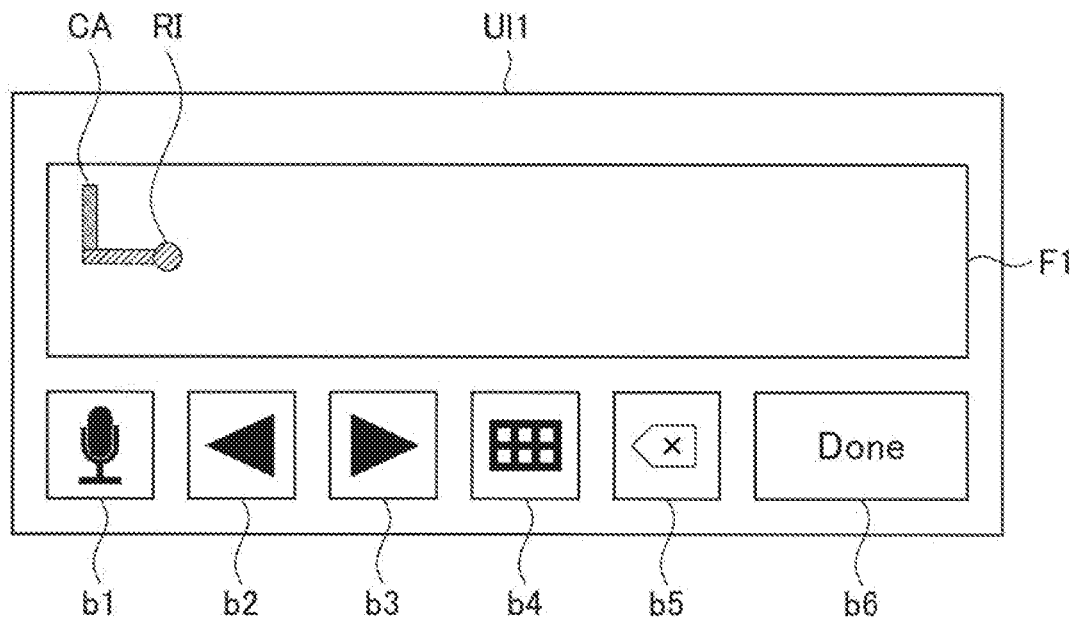
FIG. 1C is a diagram illustrating an overview of an embodiment of the present disclosure.

In addition, for example, the information processing apparatus according to the present embodiment may use the indicator RI to give feedback or the like about a speech of a user. FIG. 1C illustrates an example in which the information processing apparatus uses the indicator RI to give feedback about the length of a speech of a user. As illustrated in FIG. 1C, for example, the information processing apparatus may exert control such that the indicator RI extends from the caret CA in an input direction in accordance with the length of the speech of the user.

In addition, the information processing terminal 10 according to the present embodiment is also capable of displaying feedback for improving speech recognition accuracy, as a visual effect. In general, in the case where the length of a speech is insufficient, sometimes it is difficult for a speech recognition engine to exert its full performance. On the other hand, many speech recognition applications do not include a means for providing a user with feedback about the length of a speech. Therefore, in many cases, the user does not notice that the speech recognition accuracy is lower than expected and this is because of the length of his/her speech.

Figure 1D:
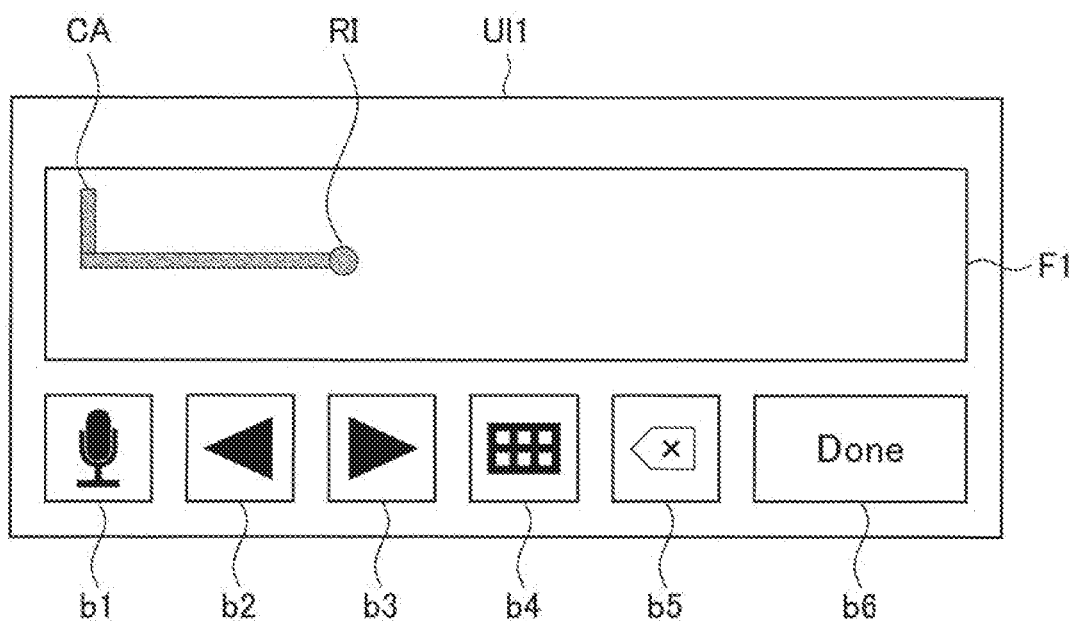
FIG. 1D is a diagram illustrating an overview of an embodiment of the present disclosure.

Accordingly, it is also possible for the information processing apparatus according to the present embodiment to switch a visual effect of the indicator RI in accordance with the length of a speech and provide a user with information indicating that the length of the speech of the user becomes sufficient. FIG. 1D is an example of the indicator RI displayed by the information processing apparatus in the case where the length of a speech is sufficient for speech recognition. Here, in comparison between the indicator RI illustrated in FIG. 1C and the indicator RI illustrated in FIG. 1D, different types of hatchings are applied to them. As described above, the information processing apparatus according to the present embodiment is capable of changing visual effects related to the indicator RI between the state where the length of a speech is insufficient and the state where the length of the speech is sufficient, and prompting a user to intuitively perceive the length of the speech.

Note that, with reference to FIG. 1C and FIG. 1D, the example in which change in a visual effect related to the indicator RI is represented by different types of hatchings, has been described. However, the information processing apparatus according to the present embodiment may give feedback about the length of a speech by using change in colors, for example. For example, the information processing apparatus may display the indicator RI in a warning color such as red in the case where the length of a speech is insufficient, and the information processing apparatus may change the color of the indicator RI to blue or the like in the case where the length of the speech becomes sufficient.

Figure 1E:
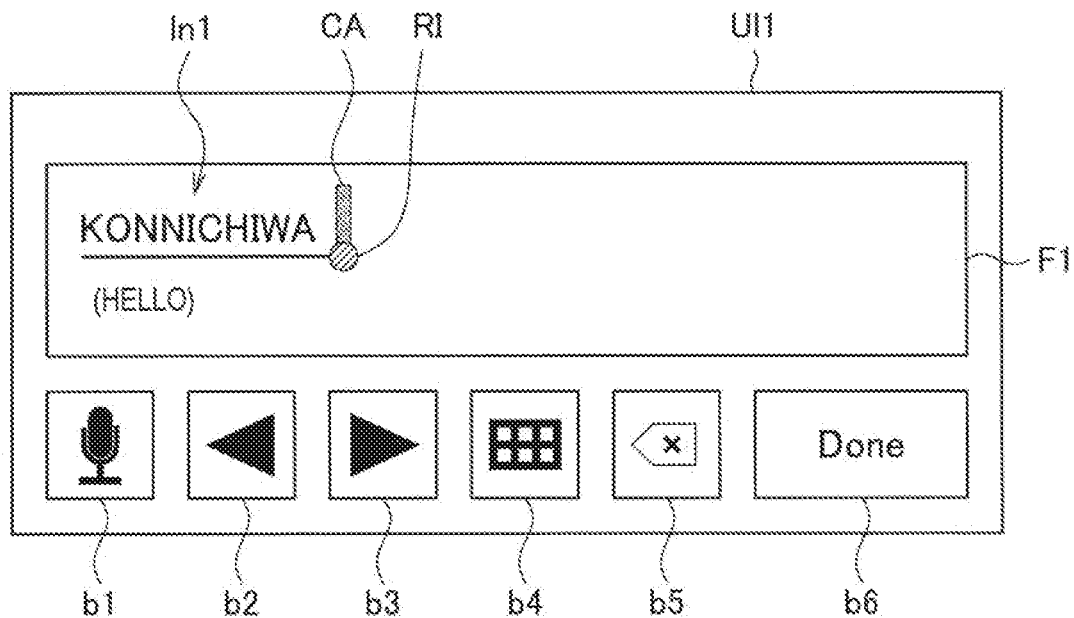
FIG. 1E is a diagram illustrating an overview of an embodiment of the present disclosure.
Figure 1F:
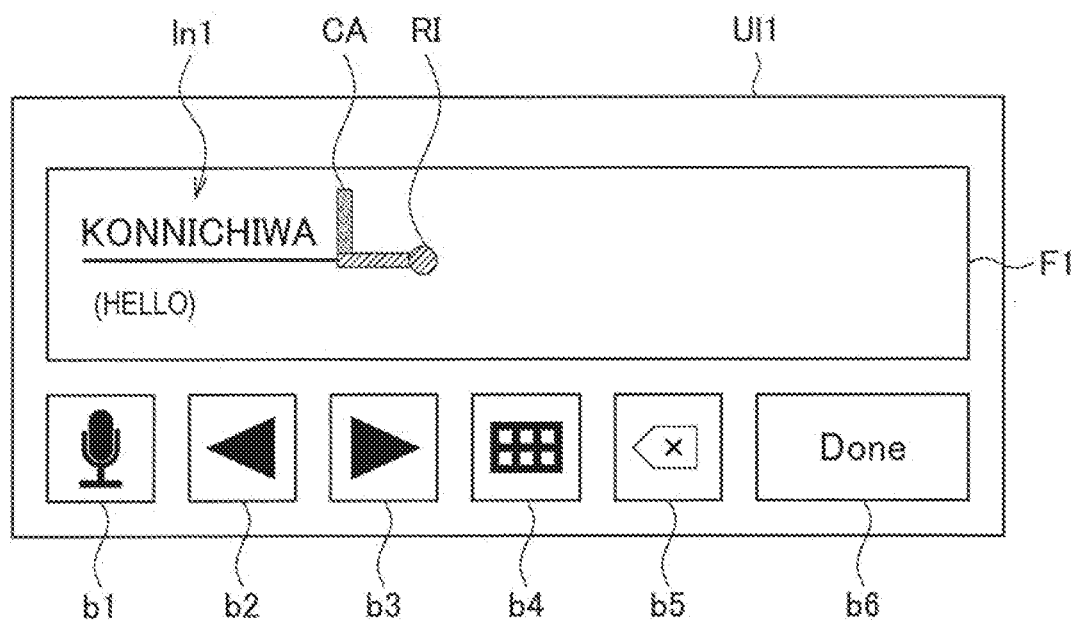
FIG. 1F is a diagram illustrating an overview of an embodiment of the present disclosure.

The information processing apparatus according to the present embodiment is capable of providing a user with various kinds of states related to speech recognition, by repeating the above-described display control on the basis of a speech of the user. FIG. 1E illustrates a character string In1 recognized on the basis of a speech made by a user in the states illustrated in FIG. 1C and FIG. 1D. At this time, the information processing apparatus may prompt the user to continue speaking by displaying the indicator RI again, the indicator RI indicating the state where speech recognition is started. In addition, in the case where the user starts speaking again, the information processing apparatus is capable of giving feedback about the speech of the user by using the indicator RI as illustrated in FIG. 1F.

As described above, the information processing apparatus according to the present embodiment is capable of displaying various kinds of visual effects in the input field F1, the visual effects indicating feedback or the like about a speech or a speech recognition starting state. By using the above-described functions of the information processing apparatus according to the present embodiment, it is possible for the user to obtain various kinds of information related to speech recognition while gazing on the input field F1. Therefore, it is possible to reduce a burden of moving a gaze and effectively prevent erroneous operation or the like.

1.2. System Configuration Example

Figure 2:
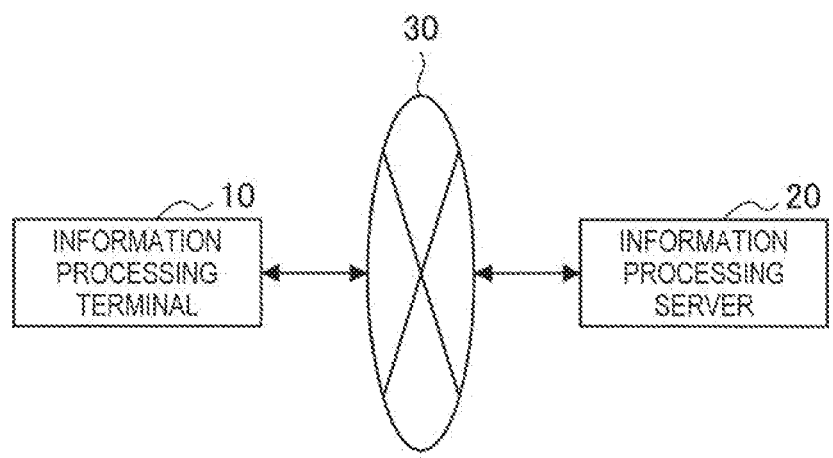
FIG. 2 is a diagram illustrating a configuration example of an information processing system according to the embodiment.

Next, a system configuration example of an information processing system according to the present embodiment will be described. FIG. 2 is a diagram illustrating a configuration example of the information processing system according to the present embodiment. With reference to FIG. 2, the information processing system according to the present embodiment includes the information processing terminal 10 and an information processing server 20. In addition, the information processing terminal 10 and the information processing server 20 are connected via a network 30 such that they communicate with each other.

Information Processing Terminal 10

The information processing terminal 10 according to the present embodiment is an information processing apparatus that provides a user with the user interface related to the recognition application. Therefore, the information processing terminal 10 according to the present embodiment includes an input function of detecting information related to the user and an output function of outputting the user interface. In addition, the information processing terminal 10 according to the present embodiment further includes a function of exerting various kinds of control related to display of the user interface on the basis of input operation, behavior, or a state of the user. In this case, a feature of the information processing terminal 10 according to the present embodiment is that a visual effect is output to an input field to which a recognition result is input on the user interface, the visual effect indicating a state related to recognition. The information processing terminal 10 according to the present embodiment may be various kinds of agents such as a smartphone, a tablet, a mobile phone, a personal computer (PC) a wearable device, or a game console, for example.

Information Processing Server 20

The information processing server 20 according to the present embodiment is an information processing apparatus that performs a recognition process on the basis of information of the user input from the information processing terminal 10. In addition, the information processing server 20 according to the present embodiment includes a function of calculating the length of a speech of the user on the basis of speech information of the user transmitted from the information processing terminal 10.

Network 30

The network 30 includes a function of connecting the information processing terminal 10 to the information processing server 20. The network 30 may include a public network such as the Internet, a telephone network, or a satellite communication network, various local area networks (LANs) including Ethernet (registered trademark), a wide area network (WAN), and the like. In addition, the network 30 may include a dedicated circuit network such as an internet protocol-virtual private network (IP-VPN). In addition, the network 30 may include a wireless communication network such as Wi-Fi (registered trademark) or Bluetooth (registered trademark).

The configuration example of the information processing system according to the present embodiment has been described above. Note that, the configuration described with reference to FIG. 2 is a mere example, and the configuration of the information processing system according to the present embodiment is not limited thereto. For example, the information processing terminal 10 and the information processing server 20 according to the present embodiment may be implemented as a single apparatus. Alternatively, the functions of the information processing terminal 10 and the information processing server 20 according to the present embodiment may be allocated to a plurality of apparatuses and implemented by the plurality of apparatuses. The configuration of the information processing system according to the present embodiment may be flexibly changed in accordance with specifications of the speech recognition application, the operation of the system, and the like appropriately.

1.3. Functional Configuration Example of Information Processing Terminal 10

Figure 3:
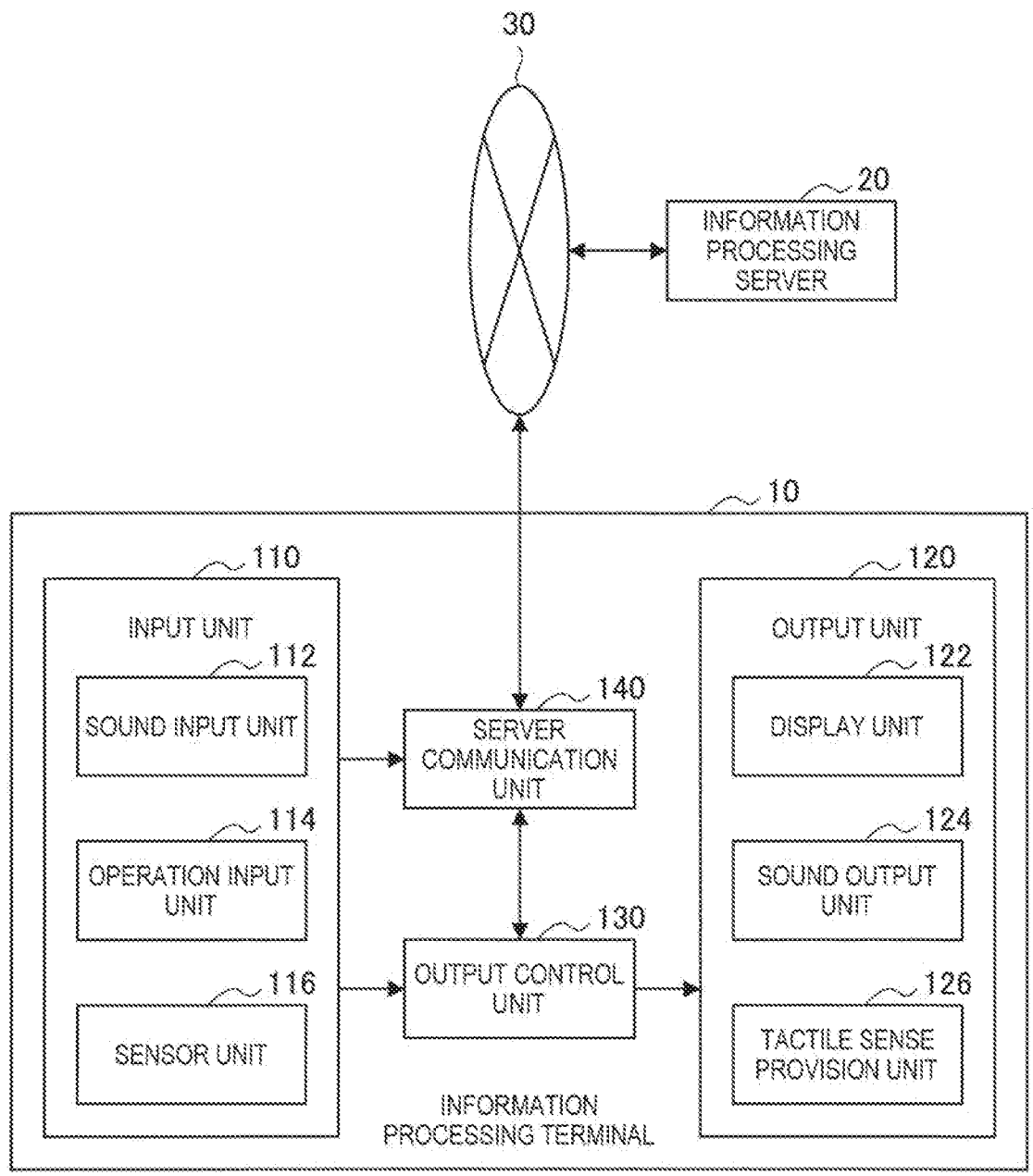
FIG. 3 is an example of a functional block diagram of an information processing terminal according to the embodiment.

Next, a functional configuration example of the information processing terminal 10 according to the present embodiment will be described. FIG. 3 is an example of a functional block diagram of the information processing terminal 10 according to the present embodiment. With reference to FIG. 3, the information processing terminal 10 according to the present embodiment includes an input unit 110, an output unit 120, an output control unit 130, and a server communication unit 140.

Input Unit 110

The input unit 110 according to the present embodiment includes a function of receiving various kinds of information input to be used for the recognition application. Therefore, the input unit 110, the input unit 110 according to the present embodiment includes a sound input unit 112, an operation input unit 114, and a sensor unit 116.

Sound Input Unit 112

The sound input unit 112 according to the present embodiment includes a function of detecting a speech of a user. Therefore, the sound input unit 112 according to the present embodiment includes a sound detection device such as a microphone.

Operation Input Unit 114

The operation input unit 114 according to the present embodiment includes a function of detecting various kinds of input operation carried out by the user. For example, the operation input unit 114 is capable of detecting speech recognition starting operation, caret moving operation, character string deleting operation, and the like carried out by the user. Therefore, the operation input unit 114 according to the present embodiment includes a mouse, a keyboard, a controller, a touchscreen, various kinds of buttons, or the like.

Sensor Unit 116

The sensor unit 116 according to the present embodiment includes a function of collecting various kinds of information related to the user who uses the recognition application. For example, the sensor unit 116 is capable of collecting information related to behavior or the like including a gesture or movement of lips or a gaze of the user. Therefore, the sensor unit 116 according to the present embodiment includes an image capturing sensor, an infrared sensor, or the like. In addition, the sensor unit 116 may collect biological information of the user. The biological information may include heartbeats, pulse, blood pressure, face temperature, body temperature, facial expression, brain waves, breathing, eye movement, or the like, for example. Therefore, the sensor unit 116 according to the present embodiment may include various kinds of biological sensors for collecting the biological information.

Output Unit 120

The output unit 120 according to the present embodiment includes a function of presenting various kinds of information to the user under the control of the output control unit 130. Therefore, the output unit 120 according to the present embodiment includes a display unit 122, a sound output unit 124, and a tactile sense provision unit 126.

Display Unit 122

The display unit 122 according to the present embodiment includes a function of providing visual information to the user under the control of the output control unit 130. Specifically, the display unit 122 according to the present embodiment may display the user interface related to the recognition application. Therefore, the display unit 122 according to the present embodiment includes a display device that provides the visual information. For example, the display device may be a cathode ray tube (CRT) display apparatus, a liquid crystal display (LCD) apparatus, an organic light emitting diode (OLED) apparatus, a touchscreen, or the like.

Sound Output Unit 124

The sound output unit 124 according to the present embodiment includes a function of providing auditory information to the user under the control of the output control unit 130. For example, the sound output unit 124 is capable of reading a recognition result by artificial voice, or outputting various kinds of sound effects or the like provided by the recognition application. Therefore, the sound output unit 124 according to the present embodiment includes an amplifier, a speaker, or the like.

Tactile Sense Provision Unit 126

The tactile sense provision unit 126 according to the present embodiment includes a function of providing tactile information to the user under the control of the output control unit 130. For example, the tactile sense provision unit 126 may output vibration together with auditory information output from the sound output unit 124. Therefore, for example, the tactile sense provision unit 126 according to the present embodiment may include a vibration device such as a linear resonant actuator (LRA) (linear vibrator), a piezo element, or an eccentric motor, and an integrated circuit (IC) that drives the vibration device.

Output Control Unit 130

The output control unit 130 according to the present embodiment includes a function of controlling various kinds of information output from the output unit 120. Specifically, the output control unit 130 according to the present embodiment may control display of the user interface related to the recognition application. In this case, the output control unit 130 according to the present embodiment is capable of outputting a visual effect to an input field to which a recognition result is input on the user interface, the visual effect indicating a state related to recognition.

Here, the visual effect may include various kinds of display objects to be displayed in the input field. For example, the output control unit 130 according to the present embodiment may cause an icon or the like to be output to the input field, the icon indicating that recognition is started.

Note that, as described above, the display objects according to the present embodiment may include a position display object such as a caret indicating an input position of a recognition result in the input field. By using the above-described functions of the output control unit 130 according to the present embodiment, it is possible for the user to perceive various kinds of information related to recognition while gazing at the input position indicated by the caret or the like.

In addition, the output control unit 130 according to the present embodiment may control the visual effect related to the input field in addition to the display objects such as the caret. For example, the output control unit 130 according to the present embodiment is capable of controlling a visual effect related to a background and a field frame of the input field.

In addition, the output control unit 130 according to the present embodiment may control a visual effect related to a character string corresponding to a recognition result.

As described above, the output control unit 130 according to the present embodiment is capable of controlling output of various kinds of visual effects on the user interface related to the recognition application. In this case, the output control unit 130 may change the visual effects on the basis of a state related to recognition. For example, the output control unit 130 causes the display unit 122 to display a visual effect accompanied by change in shape, size, color, or the like. Note that, details of the various kinds of functions of the output control unit 130 according to the present embodiment will be described later.

Server Communication Unit 140

The server communication unit 140 according to the present embodiment includes a function of performing information communication with the information processing server 20 via the network 30. Specifically, the server communication unit 140 according to the present embodiment transmits information related to a speech of the user detected by the sound input unit 112 and various kinds of sensor information collected by the sensor unit 116, to the information processing server 20. In addition, the server communication unit 140 receives a recognition result of the speech or the sensor information from the information processing server 20. In addition, the server communication unit 140 receives information related to the length of a speech of the user calculated by the information processing server 20.

The functional configuration example of the information processing terminal 10 according to the present embodiment has been described above. Note that, the configuration described with reference to FIG. 3 is a mere example, and the functional configuration of the information processing terminal 10 according to the present embodiment is not limited thereto. The information processing terminal 10 according to the present embodiment may further include a structural element other than the structural elements described above. For example, the information processing terminal 10 may include a storage unit or the like that stores various kinds of information, or may include a recognition function equivalent to the information processing server 20. On the other hand, the respective functions of the information processing terminal 10 described above may be allocated to a plurality of apparatuses and implemented by the plurality of apparatuses. For example, the input unit 110 and the output unit 120 may be implemented by a different apparatus from an apparatus including the output control unit 130. In this case, the output control unit 130 may control output from the output units 120 in a plurality of apparatuses. The functional configuration of the information processing terminal 10 according to the present embodiment may be flexibly changed.

1.4. Functional Configuration Example of Information Processing Server 20

Figure 4:
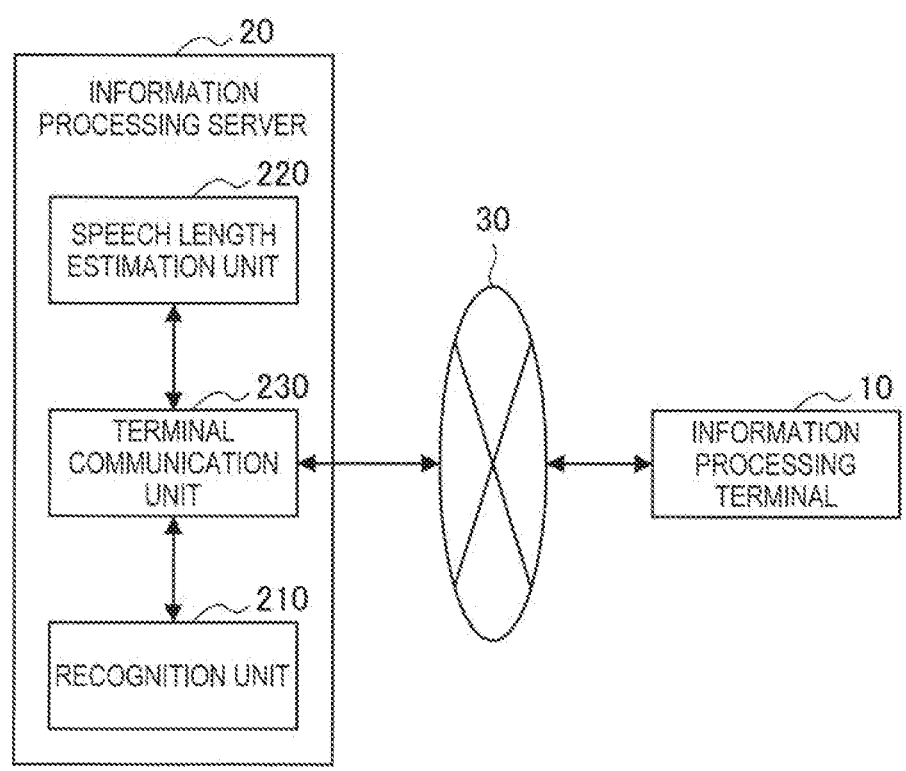
FIG. 4 is an example of a functional block diagram of an information processing server according to the embodiment.

Next, a functional configuration example of the information processing server 20 according to the present embodiment will be described. FIG. 4 is an example of a functional block diagram of the information processing server 20 according to the present embodiment. With reference to FIG. 4, the information processing server 20 according to the present embodiment includes a recognition unit 210, a speech length estimation unit 220, and a terminal communication unit 230.

Recognition Unit 210

The recognition unit 210 according to the present embodiment includes a function of performing speech recognition on the basis of user speech information transmitted from the information processing terminal 10. Specifically, the recognition unit 210 may converts a sound signal included in the speech information into character string information. In addition, as described above, the recognition unit 210 according to the present embodiment may perform recognition or estimation different from the speech recognition. For example, the recognition unit 210 according to the present embodiment may perform lip reading or the like of estimating a speech content from movement of lips of the user and converting the movement into a character string. In this case, the recognition unit 210 is capable of performing such a process on the basis of images captured by the sensor unit 116 of the information processing terminal 10.

In addition, the recognition unit 210 according to the present embodiment may estimate emotion on the basis of a speech or voice. For example, the recognition unit 210 may estimate emotion on the basis of a characteristic of a sound wave form, change in a sound quality or sound volume, an interval between speeches, a speech content, a filler word, or the like.

In addition, the recognition unit 210 according to the present embodiment may estimate emotion on the basis of biological information of the user. For example, the recognition unit 210 may estimate emotion by extracting a feature from various kinds of biological information such as brain waves, pulse, perspiration, or eye mirror movement. In this case, the recognition unit 210 is also capable of estimating the user's emotion on the basis of a plurality of pieces of biological information. The recognition unit 210 is capable of estimate emotion on the basis of image information or sensor information collected by the sensor unit 116 of the information processing terminal 10.

In addition, the recognition unit 210 according to the present embodiment may estimate an intention of the user on the basis of gaze recognition, behavior recognition, or the like. Note that, the behavior recognition may include gesture recognition. The gesture recognition may include various kinds of non-verbal actions such as a hand gesture, a neck gesture, and a body gesture. The recognition unit 210 according to the present embodiment is capable of estimate emotion on the basis of image information or sensor information collected by the sensor unit 116 of the information processing terminal 10.

In addition, the recognition unit 210 according to the present embodiment may estimate emotion or thinking that the user evokes with regard to a certain event. The event may include various kinds of visual information, auditory information, olfactory information, tactile information, or the like. For example, the recognition unit 210 according to the present embodiment is capable of estimating emotion or thinking that the user evokes when the user sees a certain image. Note that, the thinking includes a word, a sentence, or the like that the user recalls from the image. In a similar way, the recognition unit 210 according to the present embodiment is also capable of estimating emotion or thinking that the user evokes when the user receives smell, sound, tactile stimulation, or the like.

Speech Length Estimation Unit 220

The speech length estimation unit 220 according to the present embodiment includes a function of calculating the length of a speech of the user on the basis of speech information of the user transmitted from the information processing terminal 10. In this case, for example, the speech length estimation unit 220 according to the present embodiment may detect a speech section on the basis of the speech information, and may calculate the length of a speech of the user from speech sound volume in the speech section.

Figure 5:
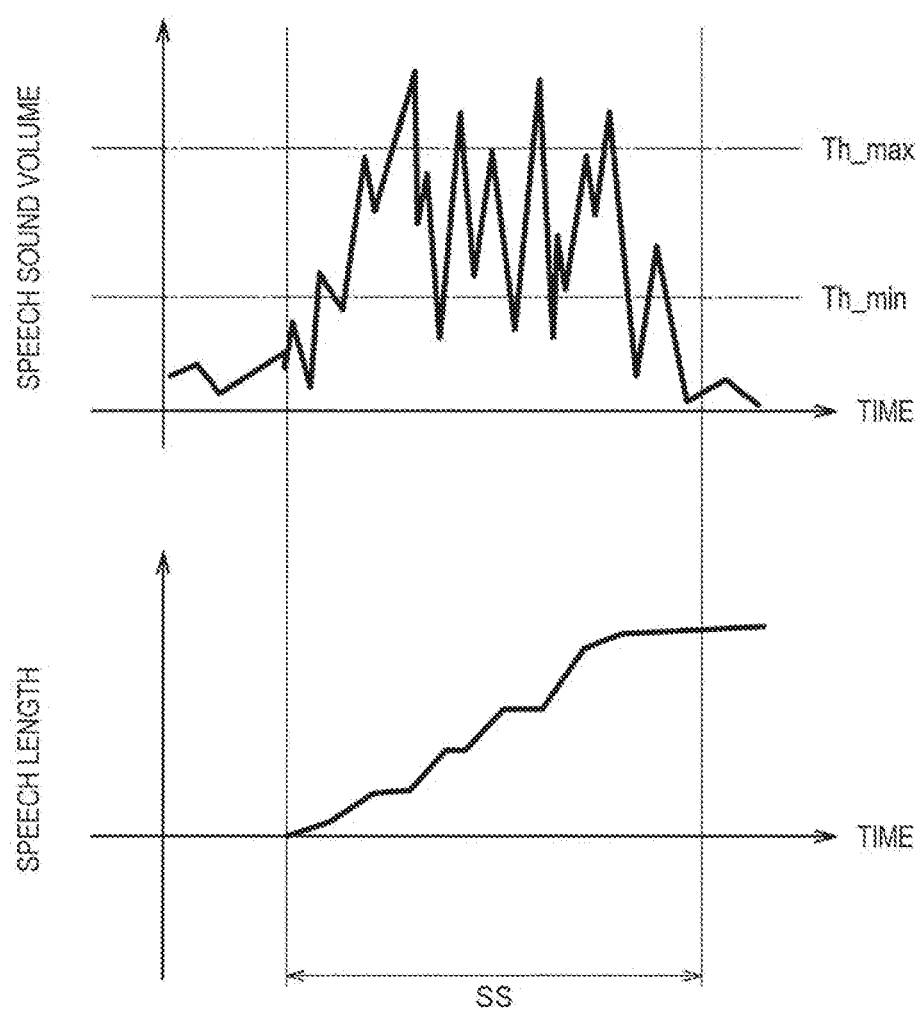
FIG. 5 is a diagram illustrating speech length calculation performed by a speech length estimation unit according to the embodiment.

FIG. 5 is a diagram illustrating speech length calculation performed by the speech length estimation unit 220 according to the present embodiment. The top of FIG. 5 illustrates speech sound volume included in speech information of the user transmitted from the information processing terminal 10, in chronological order. The bottom of FIG. 5 illustrates the length of the speech calculated on the basis of the speech sound volume in chronological order.

When detecting the length of the speech, the speech length estimation unit 220 according to the present embodiment detects a speech section SS on the basis of received speech information. At this time, the speech length estimation unit 220 may detect the speech section by using a method that is commonly used in the field of speech recognition. For example, the speech length estimation unit 220 may detect the speech section on the basis of amplitude and zero crossing, may detect the speech section on the basis of a Gaussian mixture distribution model, or may detect the speech section on the basis of a decoder, or the like.

In addition, the speech length estimation unit 220 according to the present embodiment may calculate the length of a speech of the user on the basis of a value of speech sound volume in the detected speech section SS. In this case, for example, the speech length estimation unit 220 is capable of calculating the length of the speech by integrating lengths of the speech in units of time on the basis of values of the speech sound volume that exceeds a minimum threshold Th_min in the speech section SS. Specifically, the speech length estimation unit 220 may integrate absolute values of speech sound volume that exceeds the minimum threshold Th_min, or may integrate differences between the speech sound volume and the minimum threshold Th_min. Alternatively, it is also possible for the speech length estimation unit 220 to calculate and integrate amounts of change in the speech sound volume. By using such functions of the speech length estimation unit 220 according to the present embodiment, it is possible to calculate the length of a speech while effectively eliminating noise.

In addition, at the time of the integration, the speech length estimation unit 220 may perform a process of rounding a value of speech sound volume that exceeds a maximum threshold Th_max. In this case, it is possible to prevent rapid growth in the length of the speech due to temporary increase in the speech sound volume. Therefore, an effect of preventing the user from getting a feeling of strangeness is expected when expressing feedback about the length of the speech as a visual effect.

Terminal Communication Unit 230

The terminal communication unit 230 according to the present embodiment includes a function of performing information communication with the information processing terminal 10 via the network 30. Specifically, the terminal communication unit 230 according to the present embodiment receives a speech of a user detected by the sound input unit 112 of the information processing terminal 10 and sensor information detected by the sensor unit 116. In addition, the terminal communication unit 230 transmits a recognition result obtained by the recognition unit 210 and information related to the length of the speech calculated by the speech length estimation unit 220, to the information processing terminal 10.

The functional configuration example of the information processing server 20 according to the present embodiment has been described above. Note that, the configuration described with reference to FIG. 4 is a mere example, and the functional configuration of the information processing server 20 according to the present embodiment is not limited thereto. The information processing server 20 according to the present embodiment may further include a structural element other than the structural elements described above. For example, the information processing server 20 may further include a structural element equivalent to the output control unit 130 of the information processing terminal 10. In addition, the information processing server 20 may include an input unit that detects input operation, an output unit that outputs various kinds of information, or the like. In addition, it is also possible that the respective functions of the information processing server 20 are allocated to a plurality of apparatuses and implemented by the plurality of apparatuses. For example, the recognition unit 210 and the speech length estimation unit 220 may be implemented by different apparatuses from each other. The functional configuration of the information processing server 20 according to the present embodiment may be flexibly changed.

1.5. Detail of Output Control Exerted by Output Control Unit 130

Next, details of output control exerted by the output control unit 130 of the information processing terminal 10 according to the present embodiment will be described. Hereinafter, a case where the recognition unit 210 according to the present embodiment performs speech recognition will be described as an example. In this case, the output control unit 130 according to the present embodiment is capable of causing various kinds of visual effects to be output to an input field to which a speech recognition result is input on a user interface related to a speech recognition application, the visual effects indicating states related to the speech recognition. Next, detailed examples of the visual effects controlled by the output control unit 130 will be described.

Control of Visual Effect Indicating State Related to Whether or Not Speech Recognition is Possible First, details of control of a visual effect indicating a state related to whether or not speech recognition is possible will be described, the control is exerted by the output control unit 130 according to the present embodiment. The output control unit 130 according to the present embodiment is capable of causing various kinds of visual effects to be output, the visual effects indicating states related to whether or not speech recognition is possible. More specifically, the output control unit 130 according to the present embodiment may cause a visual effect indicating a state where the speech recognition is possible, to be output. By using the above-described functions of the output control unit 130 according to the present embodiment, it is possible for the user to intuitively perceive the state where the speech recognition is possible while gazing at an input field. Therefore, it is possible to effectively prevent erroneous operation and the like.

Figure 6A:
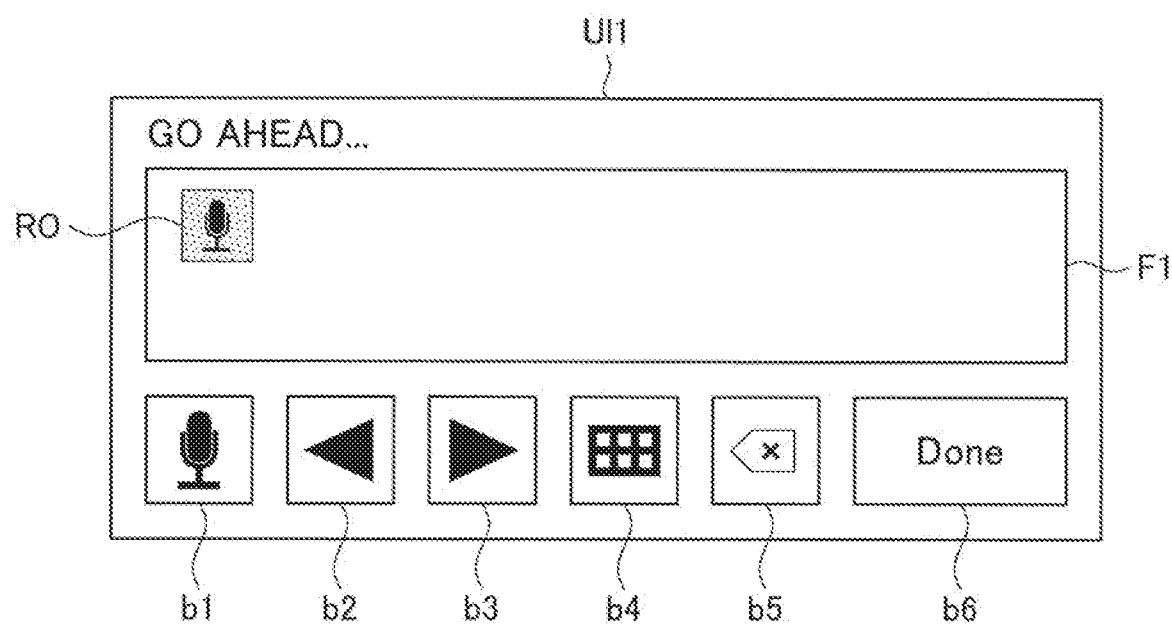
FIG. 6A is a diagram illustrating a control example of a visual effect indicating a state related to whether or not speech recognition is possible according to the embodiment.

FIGS. 6A and 6B are diagrams illustrating control examples of a visual effect indicating a state related to whether or not speech recognition is possible. For example, as illustrated in FIG. 6A, the output control unit 130 according to the present embodiment may cause a display object RO to be displayed in the input field F1, the display object RO indicating the state where speech recognition is possible. In this case, it is possible for the user to intuitively understand that the speech recognition is possible by seeing the display object RO displayed in the input field F1.

In addition, as illustrated in FIG. 6A, it is also possible for the output control unit 130 to display a message such as "go ahead" together with the display object RO such that the user is clearly prompted to speak. Note that, although not illustrated in FIGS. 6A, 6B, 6C, 6D, 6E, and 6F, the output control unit 130 may cause such a message to be displayed in the input field F1 in a translucent color, for example. In this case, an effect of reducing the user's burden of moving his/her gaze more is expected.

In addition, as described above, the display objects according to the present embodiment may include the position display object indicating an input position of a speech recognition result in the input field F1. For example, the position display object may include a caret CA illustrated in FIG. 6B. Accordingly, for example, the output control unit 130 according to the present embodiment may change a visual effect related to the caret CA to tell the user that the speech recognition is possible. FIG. 6B illustrates an example in which the output control unit 130 blinks the caret CA every 0.7 seconds in different brightness or different colors, for example.

In addition, as illustrated in FIG. 6C, the output control unit 130 according to the present embodiment may change the shape of the caret CA to tell the user that the speech recognition is possible. In an example illustrated in FIG. 6C, the output control unit 130 causes a visual effect to be displayed above the caret CA to prompt the user to speak, the visual effect changing with the passage of time. For example, the visual effect may be a visual effect of gradually filling circle objects with the passage of time. As described above, the output control unit 130 according to the present embodiment is capable of causing a visual effect to be displayed on the basis of a state related to speech recognition, the visual effect being accompanied by change in at least any of shape, size, or color.

In addition, the output control unit 130 according to the present embodiment may change a visual effect related to the input field F1 to provide the user with a state related to whether or not the speech recognition is possible. For example, as illustrated in FIG. 6D, the output control unit 130 according to the present embodiment is capable of changing a background color of the input field F1 with the passage of time to cause the user to perceive a state where speech recognition is possible. In this case, for example, the output control unit 130 may change the background of the input field F1 every one second by using different brightness or different colors.

In addition, as illustrated in FIG. 6E, the output control unit 130 according to the present embodiment may change a visual effect related to the field frame of the input field F1 with the passage of time. For example, the visual effect related to the frame field may include brightness, a color, a line type, or the like of the field frame. The output control unit 130 according to the present embodiment is capable of prompting the user to speak by repeating the above-described display control until the user speaks.

In addition, the output control unit 130 according to the present embodiment may control a visual effect related to a display object placed on the user interface UI. In an example illustrated in FIG. 6F, the output control unit 130 blinks the button b1 to tell the user that speech recognition is possible. It is also possible for the output control unit 130 to further improve the perception effect for the user by controlling a visual effect related to the input field F1 or the caret CA in addition to the button b1.

Control of Visual Effect Indicating Feedback About Speech

Next, details of control of a visual effect indicating feedback about a speech will be described, the control is exerted by the output control unit 130 according to the present embodiment. The output control unit 130 according to the present embodiment is capable of causing various kinds of visual effects to be output, the visual effects indicating feedback about a speech that is being input. Specifically, the output control unit 130 according to the present embodiment may cause feedback about the length and sound volume of the speech to be displayed in an input field to which a speech recognition result is input. By using the above-described functions of the output control unit 130 according to the present embodiment, it is possible for the user to intuitively understand the feedback about his/her speech while gazing at the input field. Therefore, it is possible to effectively improve speech recognition accuracy.

Figure 7C:
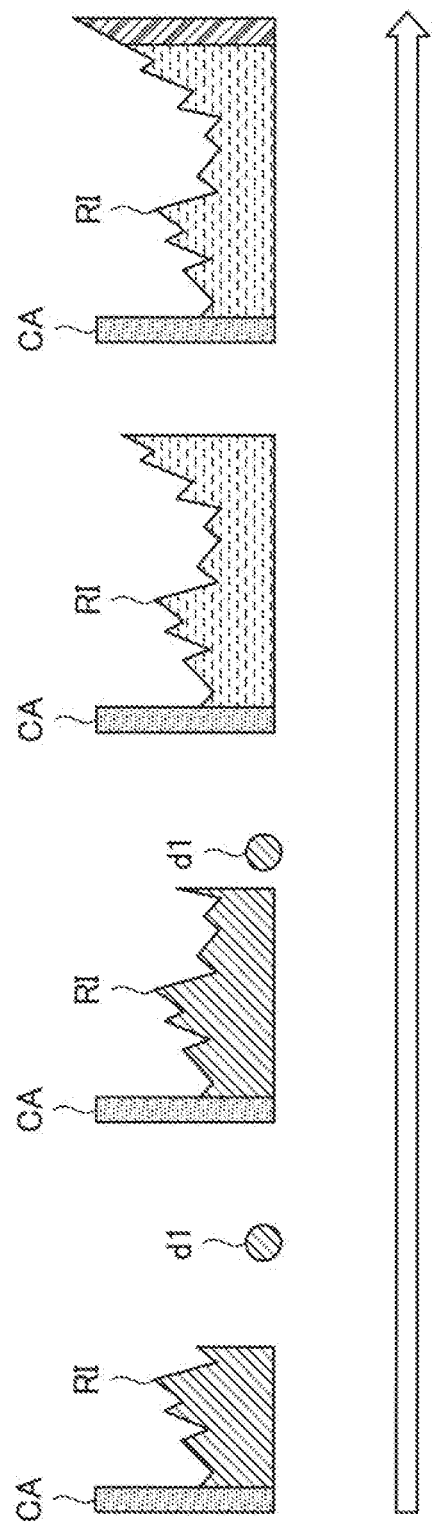
FIG. 7C is a diagram illustrating a control example of a visual effect indicating feedback about a speech according to the embodiment.

FIGS. 7A, 7B, 7C, 7D, 7E, and 7F are diagrams illustrating control examples of a visual effect indicating feedback about a speech. For example, as illustrated in FIG. 7A, the output control unit 130 according to the present embodiment may give the feedback about the speech of the user by changing the shape, color, brightness, or the like of the caret CA.

In the example illustrated in FIG. 7A, the output control unit 130 gives feedback about a speech by causing four circular objects c1 to c4 to be displayed in a caret CA and changing visual effects of the caret CA and the objects c1 to c4. In this case, as illustrated in FIG. 7A, the output control unit 130 according to the present embodiment may give feedback about the length of a speech by filling the objects c1 to c4 starting from the left. In such a way, the output control unit 130 according to the present embodiment is capable of changing the visual effects on the basis of the length of the speech.

In addition, in this case, the output control unit 130 may cause a visual effect to be displayed, the visual effect being an index of a goal of the length of a speech. With reference to the upper left part of FIG. 7A, the output control unit 130 causes the objects c1 to c4 to be displayed such that the objects c1 and c2 are displayed differently from the objects c3 and c4. Here, the objects c1 and c2 may be visual effects that are indices indicating the minimum length of a speech of a user. In other words, the user can speak so that the objects c1 and c2 are filled. In addition, as illustrated in the upper right part of FIG. 7A, the output control unit 130 may change the visual effects related to the filling of the objects c1 and c2 in the case where a speech exceeds the minimum length of the speech. For example, the output control unit 130 may change the color of the objects c1 and c2 from red to white to indicate that the goal is achieved.

In such a way, the output control unit 130 according to the present embodiment is capable of indicating that the length of a speech is insufficient or the length of the speech is sufficient, by changing visual effects. By using the above-described functions of the output control unit 130 according to the present embodiment, it is possible for the user to speak while intuitively understanding a necessary amount of speech. In addition, it is also possible to prevent a short speech and improve speech recognition accuracy.

In addition, the output control unit 130 according to the present embodiment may cause feedback about speech sound volume to be displayed together with feedback about the length of a speech as described above. For example, in the example illustrated in FIG. 7A, the output control unit 130 may change the color or brightness of the background color of the caret CA, brightness of the colors of the objects c1 to c4, or the like on the basis of speech sound volume.

In addition, the operation of the output control unit 130 is not limited to the example illustrated in FIG. 7A. The output control unit 130 is also capable of giving feedback about a speech by using various kinds of visual effects related to the caret CA. For example, as illustrated in FIG. 7B, the output control unit 130 may cause the indicator RI to be displayed together with the caret CA, the indicator RI indicating feedback about a speech.

In the example illustrated in FIG. 7B, the output control unit 130 gives feedback about the length of a speech by extending the indicator RI in the right direction on the basis of the length of the speech. In addition, in this case, the output control unit 130 may cause a goal point d1 to be displayed and guide the user to speak long, the goal point d1 indicating the minimum length of the speech.

In addition, in a way similar to the case illustrated in FIG. 7A, the output control unit 130 may change the color of the indicator RI in the case where the length of the speech exceeds the goal point d1. Therefore, it is possible to tell the user that the length of the speech has become sufficient. In addition, it is also possible for the output control unit 130 to change the brightness of the indicator RI and display feedback about a speech sound volume together with the feedback about the length of the speech.

In addition, the shape of the indicator RI according to the present embodiment is not limited to a rod-like shape illustrated in FIG. 7B. For example, as illustrated in FIG. 7C, the output control unit 130 according to the present embodiment may use a graph-like indicator RI and cause feedback about the length and sound volume of a speech to be displayed. Here, the indicator RI illustrated in FIG. 7C is a graph indicating speech sound volume. In this case, the output control unit 130 is also capable of giving feedback about the length of a speech by extending the indicator RI in the right direction on the basis of the length of the speech. In addition, in a way similar to the case illustrated in FIG. 7B, the output control unit 130 may change the color of the indicator RI in the case where the length of the speech exceeds the goal point d1. Therefore, it is possible to tell the user that the length of the speech has become sufficient.

In addition, in the case where the speech sound volume is too large, the output control unit 130 according to the present embodiment may change a visual effect related to a corresponding part of the indicator RI and warn the user. For example, in this case, it is also possible for the output control unit 130 to change the color of the indicator RI as illustrated in the right part of FIG. 7C. By using the above-described functions of the output control unit 130, it is possible to let the user perceive speech sound volume that effects the speech recognition accuracy. Note that, in this case, a threshold of a speech sound volume used for changing visual effects may be a predetermined value that is set in advance, or may be a value that is dynamically acquired from the microphone or the like included in the sound input unit 112.

In addition, in a way similar to the visual effect indicating whether or not speech recognition is possible, the output control unit 130 may give feedback about a speech by controlling a visual effect related to the input field F1. The upper left side of FIG. 7D illustrates an example in which the output control unit 130 changes brightness of a background color of the input field F1 on the basis of speech sound volume. In addition, in the case where the length of a speech becomes sufficient, the output control unit 130 is capable of changing the background color of the input field F1 to a different color and tell the state to the user, as illustrated in the upper right side of FIG. 7D.

In addition, FIG. 7E illustrates an example in which the output control unit 130 changes the field frame of the input field F1 on the basis of a speech of the user. As illustrated in the upper left side of FIG. 7E, the output control unit 130 according to the present embodiment may change brightness related to the field frame of the input field F1 on the basis of speech sound volume. In addition, in the case where the length of the speech becomes sufficient, the output control unit 130 according to the present embodiment is capable of changing the color of the field frame of the input field F1 to a different color and tell the state to the user, as illustrated in the upper right side of FIG. 7E.

In addition, the output control unit 130 according to the present embodiment may control a visual effect related to a display object placed on the user interface UI and give feedback about a speech. In an example illustrated in FIG. 7F, the output control unit 130 controls a visual effect related to the button b1 and cause feedback about a speech to be displayed. In this case, for example, the output control unit 130 may give feedback about the length of a speech by filling the background of the button b1 in the right direction in accordance with the length of the speech, as illustrated in the upper right side of FIG. 7F. In addition, in this case, the output control unit 130 also changes the color of the background of the button b1 in the case where the length of a speech exceeds the goal point d1. Therefore, it is possible to tell the user that the length of the speech has become sufficient. In addition, as illustrated in the upper left side of FIG. 7F, it is also possible for the output control unit 130 to change the brightness of the background color and give feedback about speech sound volume.

As described above, the output control unit 130 according to the present embodiment is capable of giving feedback about the length and sound volume of a speech to a user by controlling various kinds of visual effects on the basis of the speech of the user. Note that, the above-described visual effect control is a mere example, and the visual control according to the present embodiment is not limited thereto. The control functions of the output control unit 130 according to the present embodiment may be flexibly changed.

Control of Visual Effect Displayed Together with Speech Recognition Result

Next, details of control of a visual effect displayed together with a speech recognition result according to the present embodiment will be described. The output control unit 130 according to the present embodiment is capable of causing a visual effect related to feedback about a speech to be output together with a speech recognition result. Specifically, the output control unit 130 according to the present embodiment may cause a visual effect to be displayed together with a speech recognition result, the visual effect indicating that length of a speech is insufficient. By using the above-described functions of the output control unit 130 according to the present embodiment, it is possible for the user to intuitively understand a relation between the length of the speech and recognition accuracy, and apply the relation to a future speech.

Figure 8A:
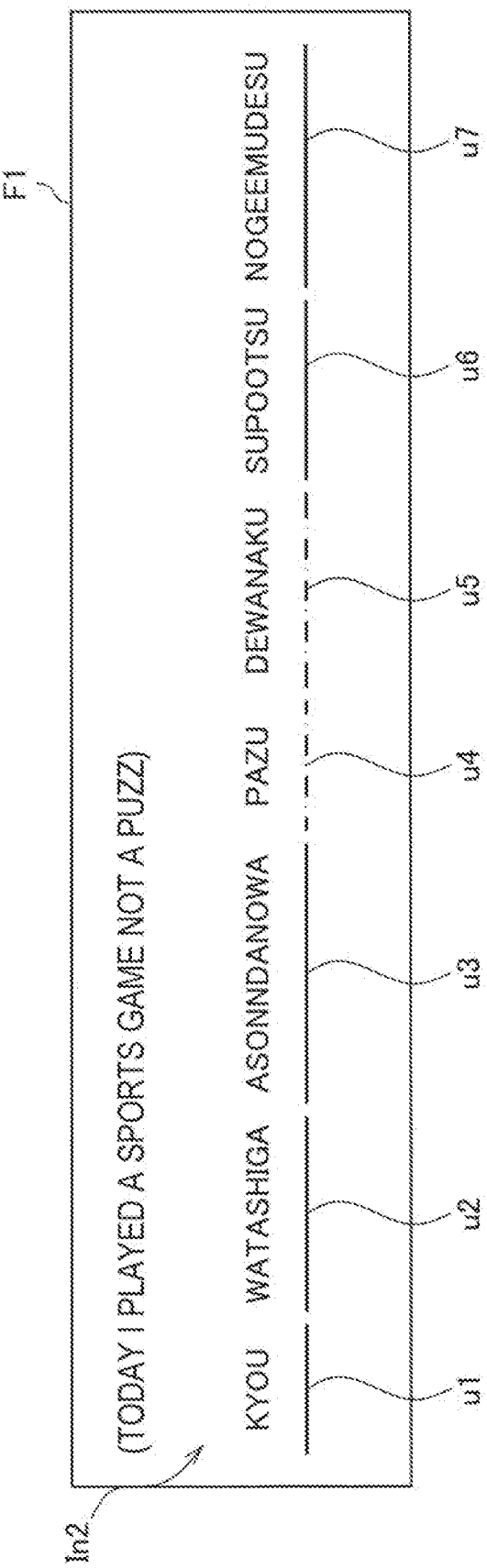
FIG. 8A is a diagram illustrating a control example of a visual effect that is displayed together with a speech recognition result according to the embodiment.

FIGS. 8A, 8B, 8C, 8D, and 8E are diagrams illustrating control examples of a visual effect that is displayed together with a speech recognition result. For example, as illustrated in FIG. 8A, the output control unit 130 according to the present embodiment may give feedback about a speech by causing underline-like visual effects u1 to u7 to be displayed under a character string in2 that is input into the input field F1 through speech recognition. In this case, the output control unit 130 according to the present embodiment may cause the underline-like visual effects u1 to u7 to be displayed in units of groups such as recognized paragraphs or words.

In addition, the output control unit 130 is capable of changing expression related to the underline-like visual effects u1 to u7 on the basis of the length of the speech obtained at the time of speech recognition. For example, in the example illustrated in FIG. 8A, the output control unit 130 causes solid-underline-like visual effects u1 to u3 and u6 to u7 to be displayed under group units whose speech lengths are sufficient, and causes dashed-dotted-underline-like visual effects u4 and u5 to be displayed under group units whose speech lengths are insufficient. Note that, the output control unit 130 may give feedback by using not only different types of lines described above, but also different colors.

As described above, the output control unit 130 according to the present embodiment causes feedback about the length of a speech to be displayed together with a speech recognition result. Therefore, it is possible for a user to understand a relation between recognition accuracy and the length of the speech. For example, FIG. 8A illustrates the example in which a user says, "kyou watashiga asonndanowa, pazuru, dewanaku, supootsuno geemudesu" (Today, I played a sports game, not a puzzle). In this case, the user sees the character string "pazu" (puzz) that is recognized erroneously and the underline-like visual effect u4 that is displayed together with the character string. Accordingly, it is possible for the user to understand that recognition accuracy is poor in the case where the length of the speech is short.

Figure 8B:
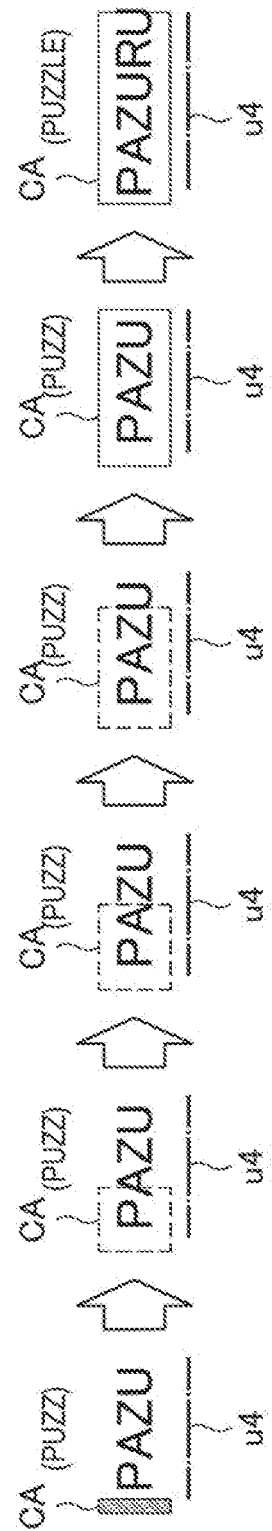
FIG. 8B is a diagram illustrating a control example of a visual effect that is displayed together with a speech recognition result according to the embodiment.

In addition, in this case, it is also possible for the user to correct the speech recognition result by operating the caret CA, selecting the character string "pazu" (puzz), and then speaking again. FIG. 8B is a diagram illustrating correction of the speech recognition result according to the present embodiment. FIG. 8B illustrates an illustration in which the user operates the caret CA and selects the character string. In this case, as illustrated in FIG. 8B, the output control unit 130 according to the present embodiment may exert control such that the shape of the caret CA is changed through animation and a group unit is selected.

FIG. 8B illustrates a display control example in which the user moves the caret CA in the right direction in the case where the caret CA is placed at the left side of the character string "pazu" (puzz). In this case, the output control unit 130 may gradually change the size of the caret CA such that the shape of the caret CA is changed to a frame shape and the caret CA extends to enclose the whole character string "pazu" (puzz). After the whole character string "pazu"

(puzz) is selected, the user is capable of correcting the erroneously recognized speech recognition result by speaking again.

In addition, the visual effects displayed together with the sound recognition result are not limited to the underline-like visual effects illustrated in FIG. 8A. For example, as illustrated in FIG. 8C, the output control unit 130 according to the present embodiment may cause partition-like visual effects p1 to p6 to be displayed between the group units. In this case, the output control unit 130 may change extension directions of the partition-like visual effects p1 to p6 on the basis of the lengths of pieces of the speech. In the example illustrated in FIG. 8C, the output control unit 130 causes the group units whose speech lengths are insufficient to be displayed such that they are sandwiched by the partition-like visual effects p3 to p5 that extend downward from a rule r. In addition, the output control unit 130 causes group units other than the insufficient group units to be displayed by using the partition-like visual effects p1, p2, and p6 that extend upward from the rule r.

Figure 8D:
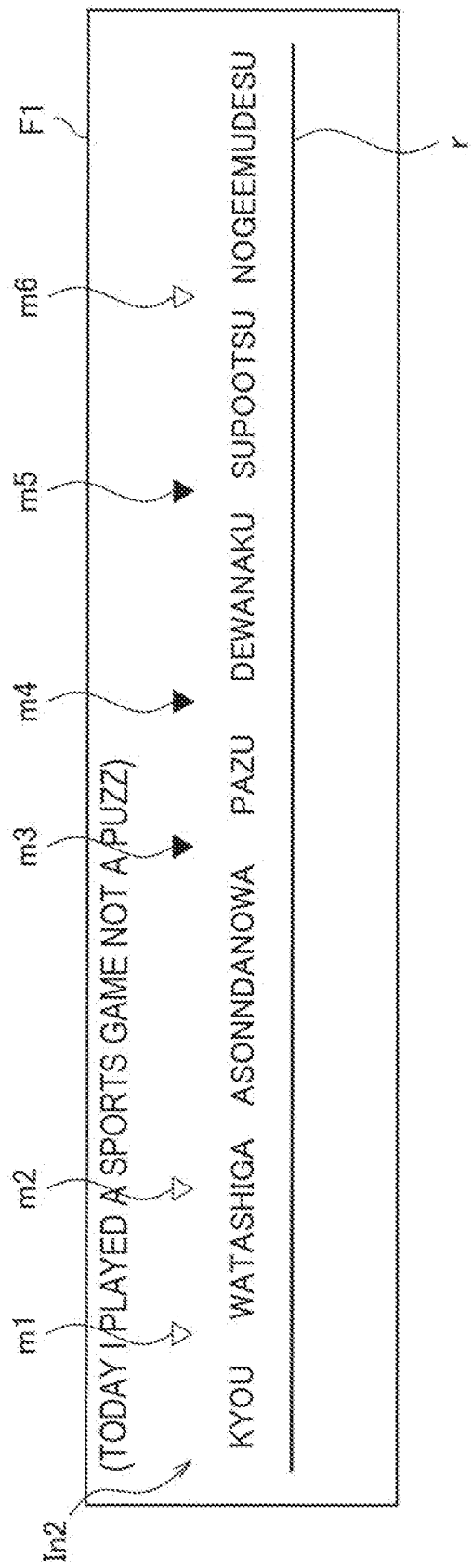
FIG. 8D is a diagram illustrating a control example of a visual effect that is displayed together with a speech recognition result according to the embodiment.

In addition, as illustrated in FIG. 8D, the output control unit 130 according to the present embodiment may cause the group units to be displayed by using marker-like visual effects m1 to m6. In this case, the output control unit 130 is also capable of changing expression of the marker-like visual effects m1 to m6 on the basis of the length of the pieces of the speech, in a similar way. In the example illustrated in FIG. 8D, the output control unit 130 causes the group units whose speech lengths are insufficient to be displayed such that they are sandwiched by the black marker-like visual effects m3 to m5. In addition, the output control unit 130 causes group units other than the insufficient group units to be displayed by using the while marker-like visual effects m1, m2, and m6.

In addition, as illustrated in FIG. 8E, the output control unit 130 according to the present embodiment is also capable of expressing partitions by changing background colors of the character string In2 for each group unit. In the example illustrated in FIG. 8E, the output control unit 130 expresses the partitions by using background visual effects b1 to b4 for alternately decorating the group units. In addition, in this case, the output control unit 130 causes character strings $In2_4$ and $In2_5$ whose speech lengths are insufficient to be displayed by using a font that is different from a font for the other group units. Accordingly, feedback about the lengths of the pieces of the speech is given to the user. As described above, the visual effects according to the present embodiment may include visual effects related to a character string corresponding to a speech recognition result.

1.6. Procedure of Operation of Information Processing Terminal 10

Next, details procedure of operation of the information processing terminal 10 according to the present embodiment will be described. FIG. 9 is a flowchart illustrating the procedure of the operation of the information processing terminal 10. Note that, FIG. 9 illustrates procedure of operation performed by the information processing terminal 10 in the case where the information processing server 20 according to the present embodiment performs speech recognition.

With reference to FIG. 9, the server communication unit 140 of the information processing terminal 10 first acquires information related to speech recognition from the information processing server 20 (Step S1101).

Next, the output control unit 130 according to the present embodiment determines whether or not the speech recognition is possible on the basis of the information related to speech recognition received in Step S1101 (Step S1102).

Here, in the case where the output control unit 130 determines that the speech recognition is not possible (NO in Step S1102), the information processing terminal 10 ends the display control process of visual effects indicating states related to the speech recognition.

On the other hand, in the case where the output control unit 130 determines that the speech recognition is possible (YES in Step S1102), the output control unit 130 subsequently determines whether or not the information related to speech recognition received in Step S1101 includes information related to the length and sound volume of a speech (Step S1103).

Here, in the case where the output control unit 130 determines that the information related to speech recognition does not include the information related to the length and sound volume of the speech (NO in Step S1103), the output control unit 130 subsequently performs display control such that a visual effect is displayed, the visual effect indicating that the speech recognition is possible (Step S1104).

On the other hand, in the case where the output control unit 130 determines that the information related to speech recognition includes the information related to the length and sound volume of a speech (YES in Step S1103), the output control unit 130 subsequently determines whether or not the information related to speech recognition received in Step S1101 includes a speech recognition result (Step S1105).

Here, in the case where the output control unit 130 determines that the information related to speech recognition does not include the speech recognition result (NO in Step S1105), the output control unit 130 subsequently performs display control such that a visual effect is displayed, the visual effect indicating feedback about the length and sound volume of the speech (Step S1106). Subsequently, the information processing terminal 10 ends the series of processes.

On the other hand, in the case where the output control unit 130 determines that the information related to speech recognition includes the speech recognition result (YES in Step S1105), the output control unit 130 subsequently performs display control such that a visual effect is displayed, the visual effect indicating feedback about t the length and sound volume of the speech (Step S1107). Subsequently, the information processing terminal 10 ends the series of processes.

2. Hardware Configuration Example

An example of the hardware configuration common to the information processing terminal 10 and the information processing server 20 according to the present disclosure is now described. FIG. 10 is a block diagram illustrating an example of the hardware configuration of the information processing terminal 10 and the information processing server 20 according to the present disclosure. Referring to FIG. 10, the information processing terminal 10 and the information processing server 20 each includes, in one example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Moreover, the hardware configuration shown here is illustrative, and some of components can be omitted. In addition, a component other than the components shown here can be further included.

CPU 871

The CPU 871 functions as, in one example, an arithmetic processing unit or a control device, and controls some or all of the operations of each component on the basis of various programs recorded in the ROM 872, the RAM 873, the storage 880, or a removable recording medium 901.

ROM 872 and RAM 873

The ROM 872 is a means for storing programs loaded into the CPU 871, data used for operation, or the like. The RAM 873 temporarily or permanently stores, in one example, a program to be loaded into the CPU 871, various parameters appropriately changing in executing the program, or the like.

Host Bus 874, Bridge 875, External Bus 876, and Interface 877

The CPU 871, the ROM 872, and the RAM 873 are mutually connected via, in one example, the host bus 874 capable of high-speed data transmission. On the other hand, the host bus 874 is connected to the external bus 876 having a relatively low data transmission rate, in one example, via the bridge 875. In addition, the external bus 876 is connected to various components via the interface 877.

Input Device 878

Examples of the input device 878 include a mouse, a keyboard, a touch panel, buttons, a switch, a lever, or the like. Furthermore, examples of the input device 878 include a remote controller capable of transmitting a control signal using infrared rays or other radio waves (hereinafter referred to as a remote controller). In addition, the input device 878 includes a speech input device such as a microphone.

Output Device 879

The output device 879 is a device capable of visually or audibly notifying the user of the acquired information, which includes a display device such as a cathode ray tube (CRT), an LCD, or an organic EL, an audio output device such as a loudspeaker or a headphone, a printer, a mobile phone, a facsimile, or the like. In addition, the output device 879 according to the present disclosure includes various kinds of vibration devices capable of outputting tactile stimulation.

Storage 880

The storage 880 is a device used to store various types of data. Examples of the storage 880 include a magnetic storage device such as hard disk drives (HDDs), a semiconductor storage device, an optical storage device, a magneto-optical storage device, or the like.

Drive 881

The drive 881 is a device that reads information recorded on the removable recording medium 901 such as a magnetic disk, an optical disk, a magneto-optical disk, or semiconductor memory or writes information to the removable recording medium 901.

Removable Recording Medium 901

Examples of the removable recording medium 901 include a DVD medium, a Blu-ray (registered trademark) medium, an HD DVD medium, various kinds of semiconductor storage media, or the like. Of course, the removable recording medium 901 is preferably, in one example, an IC card or an electronic device mounted with a contactless IC chip.

Connection Port 882

The connection port 882 is a port used for connection with an external connection device 902, such as a universal serial bus (USB) port, an IEEE 1394 port, a small computer system interface (SCSI), an RS-232C port, or an optical audio terminal.

External Connection Device 902

Examples of the external connection device 902 include a printer, a portable music player, a digital camera, a digital video camera, an IC recorder, or the like.

Communication Device 883

The communication device 883 is a communication device used for connection with a network, and examples thereof include a communication card for wired or wireless LAN, Bluetooth (registered trademark), or wireless USB (WUSB), a router for optical communication, a router for asymmetric digital subscriber line (ADSL), or a modem for various communications.

3. Conclusion

As described above, the output control unit 130 according to the present disclosure is capable of causing various kinds of visual effects indicating states related to recognition to be displayed in an input field to which a recognition result is input. More specifically, the output control unit 130 according to the present disclosure is capable of causing a visual effect to be displayed in the input field, the visual effect indicating that the recognition is possible. In addition, the output control unit 130 according to the present disclosure is capable of causing a visual effect to be displayed in the input field, the visual effect indicating feedback about the length and sound volume of a speech. According to the above-described configuration, it is possible to reduce a burden of moving a gaze on a user interface related to a recognition application.

The preferred embodiment(s) of the present disclosure has/have been described above with reference to the accompanying drawings, whilst the present disclosure is not limited to the above examples. A person skilled in the art can find various alterations and modifications within the scope of the appended claims, and it should be understood that they will naturally come under the technical scope of the present disclosure.

Further, the respective steps in the processing of the information processing terminal 10 in this specification are not necessarily executed in chronological order in accordance with the order illustrated in the flowcharts. In one example, the respective steps in the processing of the information processing terminal 10 can be processed in the order different from the order illustrated in the flowcharts, or can also be processed in parallel.

Further, the effects described in this specification are merely illustrative or exemplified effects, and are not limitative. That is, with or in the place of the above effects, the technology according to the present disclosure can achieve other effects that are clear to those skilled in the art from the description of this specification.

Additionally, the present technology may also be configured as below.

(1)

An information processing apparatus including an output control unit configured to control display of a user interface related to a recognition application, in which the output control unit causes a visual effect to be output to an input field to which a recognition result is input, the visual effect indicating a state related to recognition.

(2)

The information processing apparatus according to (1), in which the visual effect includes a display object to be displayed in the input field.

(3)

The information processing apparatus according to (2), in which the display object includes a position display object indicating an input position of the recognition result in the input field.

(4)

The information processing apparatus according to any one of (1) to (3), in which the visual effect includes a visual effect related to a background of the input field.

(5)

The information processing apparatus according to any one of (1) to (4), in which the visual effect includes a visual effect related to a field frame of the input field.

(6)

The information processing apparatus according to any one of (1) to (5), in which the visual effect includes a visual effect related to a character string corresponding to the recognition result.

(7)

The information processing apparatus according to any one of (1) to (6), in which the output control unit changes the visual effect on the basis of the state related to the recognition.

(8)

The information processing apparatus according to any one of (1) to (7), in which the output control unit causes a visual effect to de displayed on the basis of the state related to the recognition, the visual effect being accompanied by change in at least any of shape, size, or color.

(9)

The information processing apparatus according to any one of (1) to (8), in which the state related to the recognition includes feedback about a speech.

(10)

The information processing apparatus according to (9), in which the feedback about the speech includes feedback about a speech that is being input.

(11)

The information processing apparatus according to (9) or (10), in which the feedback about the speech includes feedback about length of the speech.

(12)

The information processing apparatus according to (11), in which the output control unit changes the visual effect on the basis of the length of the speech.

(13)

The information processing apparatus according to (11) or (12), in which the output control unit causes a visual effect to be displayed, the visual effect indicating that the length of the speech is insufficient.

(14)

The information processing apparatus according to any one of (11) to (13), in which the output control unit causes the visual effect to be output on the basis of the length of the speech calculated from speech sound volume in a speech section.

(15)

The information processing apparatus according to any one of (9) to (13), in which the output control unit causes a visual effect to be output together with the recognition result, the visual effect relating to the feedback about the speech.

(16)

The information processing apparatus according to any one of (9) to (14), in which the output control unit causes a visual effect to be displayed together with the recognition result, the visual effect indicating that length of the speech is insufficient.

(17)

The information processing apparatus according to any one of (1) to (16), in which the state related to the recognition includes a state related to whether or not the recognition is possible.

(18)

The information processing apparatus according to (17), in which the output control unit causes a visual effect to be displayed, the visual effect indicating a state capable of recognition.

(19)

The information processing apparatus according to any one of (1) to (18), further including an input unit configured to detect a speech of a user.

(20)

An information processing method including controlling, by a processor, display of a user interface related to a recognition application, in which controlling of the display further includes causing a visual effect to be output to an input field to which a recognition result is input, the visual effect indicating a state related to recognition.

REFERENCE SIGNS LIST

10 information processing terminal
110 input unit
112 sound input unit
114 operation input unit
116 sensor unit
120 output unit
122 display unit
124 sound output unit
126 tactile sense provision unit
130 output control unit 140 server communication unit
20 information processing server
210 recognition unit
220 speech length estimation unit
230 terminal communication unit

The invention claimed is:

1. An information processing apparatus, comprising:
an output control unit configured to:
control display of a user interface related to a recognition application;
control output of a visual effect to an input field to which a recognition result is input, wherein
the user interface includes the input field,
the visual effect indicates a specific state related to recognition of a speech, and
the specific state related to the recognition of the speech includes feedback related to a length of the speech;
control display of an indicator in the input field;
control extension of a length of the displayed indicator in the input field based on an increase in the length of the speech; and
change the visual effect based on the increase in the length of the speech, wherein the change in the visual effect is different from the extension of the length of the displayed indicator.

2. The information processing apparatus according to claim 1, wherein the visual effect includes a visual effect related to a background of the input field.

3. The information processing apparatus according to claim 1, wherein the visual effect includes a visual effect related to a field frame of the input field.

4. The information processing apparatus according to claim 1, wherein the visual effect includes a visual effect related to a character string corresponding to the recognition result.

5. The information processing apparatus according to claim 1, wherein
the output control unit is further configured to control display of the visual effect based on the specific state related to the recognition, and
the change in the visual effect includes a change in at least one of a shape of the indicator, a size of the indicator, or a color of the indicator.

6. The information processing apparatus according to claim 1, wherein
the output control unit is further configured to control display of the visual effect in one of a first state of the visual effect or a second state of the visual effect,
the first state of the visual effect indicates that the length of the speech is insufficient for the recognition of the speech, and
the second state of the visual effect indicates that the length of the speech is sufficient for the recognition of the speech.

7. The information processing apparatus according to claim 1, wherein the length of the speech is calculated from a speech sound volume in a speech section.

8. The information processing apparatus according to claim 1, wherein
the output control unit is further configured to control output of the visual effect together with the recognition result, and
the recognition result corresponds to a character string.

9. The information processing apparatus according to claim 1, wherein
the output control unit is further configured to control display of the recognition result together with the visual effect in one of a first state of the visual effect or a second state of the visual effect,
the first state of the visual effect indicates that the length of the speech is insufficient for the recognition of the speech, and
the second state of the visual effect indicates that the length of the speech is sufficient for the recognition of the speech.

10. The information processing apparatus according to claim 1, wherein the specific state related to the recognition includes a state related to whether the recognition is possible.

11. The information processing apparatus according to claim 10, wherein
the output control unit is further configured to control display of the visual effect, and
the visual effect indicates that the specific state is capable of recognition.

12. The information processing apparatus according to claim 1, further comprising an input unit configured to detect the speech, wherein the speech is of a user.

13. An information processing method, comprising:
controlling, by a processor, display of a user interface related to a recognition application;
controlling, by the processor, output of visual effect to an input field to which a recognition result is input, wherein
the user interface includes the input field,
the visual effect indicates a state related to recognition of a speech, and
the state related to the recognition of the speech includes feedback related to a length of the speech;
controlling, by the processor, display of an indicator in the input field;
controlling, by the processor, extension of a length of the displayed indicator in the input field based on an increase in the length of the speech; and
changing, by the processor, the visual effect based on the increase in the length of the speech, wherein the change in the visual effect is different from the extension of the length of the displayed indicator.

* * * * *